US010490096B2

(12) United States Patent
Sorenson et al.

(10) Patent No.: US 10,490,096 B2
(45) Date of Patent: Nov. 26, 2019

(54) LEARNER INTERACTION MONITORING SYSTEM

(76) Inventors: Peter Floyd Sorenson, New Haven, CT (US); David Michael Kaplan, Cromwell, CT (US)

(*) Notice: Subject to any disclaimer, the term of this patent is extended or adjusted under 35 U.S.C. 154(b) by 349 days.

(21) Appl. No.: 13/540,359

(22) Filed: Jul. 2, 2012

(65) Prior Publication Data

US 2013/0004930 A1    Jan. 3, 2013

Related U.S. Application Data

(60) Provisional application No. 61/503,810, filed on Jul. 1, 2011.

(51) Int. Cl.
G09B 7/02 (2006.01)

(52) U.S. Cl.
CPC ..................... *G09B 7/02* (2013.01)

(58) Field of Classification Search
CPC ....................................................... G09B 7/02
USPC .......................... 434/350; 705/7.39, 7.42, 11
See application file for complete search history.

(56) References Cited

U.S. PATENT DOCUMENTS

| 5,893,717 | A  | * | 4/1999  | Kirsch et al. ................. 434/118 |
| 6,064,381 | A  | * | 5/2000  | Harel ............................. 715/705 |
| 6,305,942 | B1 | * | 10/2001 | Block et al. ................... 434/156 |
| 6,468,084 | B1 | * | 10/2002 | MacMillan .................... 434/185 |
| 6,606,479 | B2 | * | 8/2003  | Cook et al. .................... 434/350 |
| 6,755,659 | B2 | * | 6/2004  | LoSasso et al. ............... 434/219 |
| 6,869,287 | B1 | * | 3/2005  | Tadlock et al. ................ 434/178 |
| 6,938,210 | B1 | * | 8/2005  | Huh ................................ 715/730 |
| 7,062,220 | B2 | * | 6/2006  | Haynes et al. ................. 434/353 |
| 7,131,842 | B2 |   | 11/2006 | Hollingsworth et al. |
| 8,260,189 | B2 | * | 9/2012  | Chainer et al. ................ 434/350 |
| 8,386,928 | B1 | * | 2/2013  | Asch et al. .................... 715/704 |
| 2004/0046792 | A1 | * | 3/2004 | Coste et al. ................... 345/763 |
| 2005/0053908 | A1 |   | 3/2005 | Satheesh et al. |
| 2005/0181348 | A1 | * | 8/2005 | Carey et al. ................... 434/350 |
| 2008/0131851 | A1 | * | 6/2008 | Kanevsky et al. ............ 434/157 |
| 2009/0035733 | A1 |   | 2/2009 | Meitar et al. |
| 2009/0051877 | A1 | * | 2/2009 | Delahunt et al. ............. 351/246 |
| 2009/0113306 | A1 | * | 4/2009 | Fujishita et al. .............. 715/729 |
| 2009/0186328 | A1 | * | 7/2009 | Robinson et al. ............ 434/350 |
| 2010/0190143 | A1 |   | 7/2010 | Gal et al. |
| 2010/0291528 | A1 |   | 11/2010 | Huerta |
| 2011/0076650 | A1 | * | 3/2011 | Best et al. ....................... 434/69 |

(Continued)

*Primary Examiner* — Eddy Saint-Vil
*Assistant Examiner* — William D Ermlick
(74) *Attorney, Agent, or Firm* — St Onge Steward Johnston and Reens LLC

(57) ABSTRACT

The Learner Interaction Monitoring Systems (LiMS) is a web-based application that can interface with any web-based course delivery platform to transform the online learning environment into an active observer of learner engagement. The LiMS 'event capture model' collects detailed real-time data on learner behavior in self-directed online learning environments, and interprets these data by drawing on behavioral research. The LiMS offers education and training managers in corporate contexts a valuable tool for the evaluation of learner performance and course design. By allowing more detailed demonstration of ROI in education and training, LiMS allows managers to make the case for web based courseware that reflects appropriate and evidence-based instructional design, rather than budgetary constraints.

37 Claims, 28 Drawing Sheets

(56) References Cited

U.S. PATENT DOCUMENTS

2011/0167013 A1 7/2011 Pogue et al.
2012/0295679 A1* 11/2012 Izkovsky et al. .......... 463/7

* cited by examiner

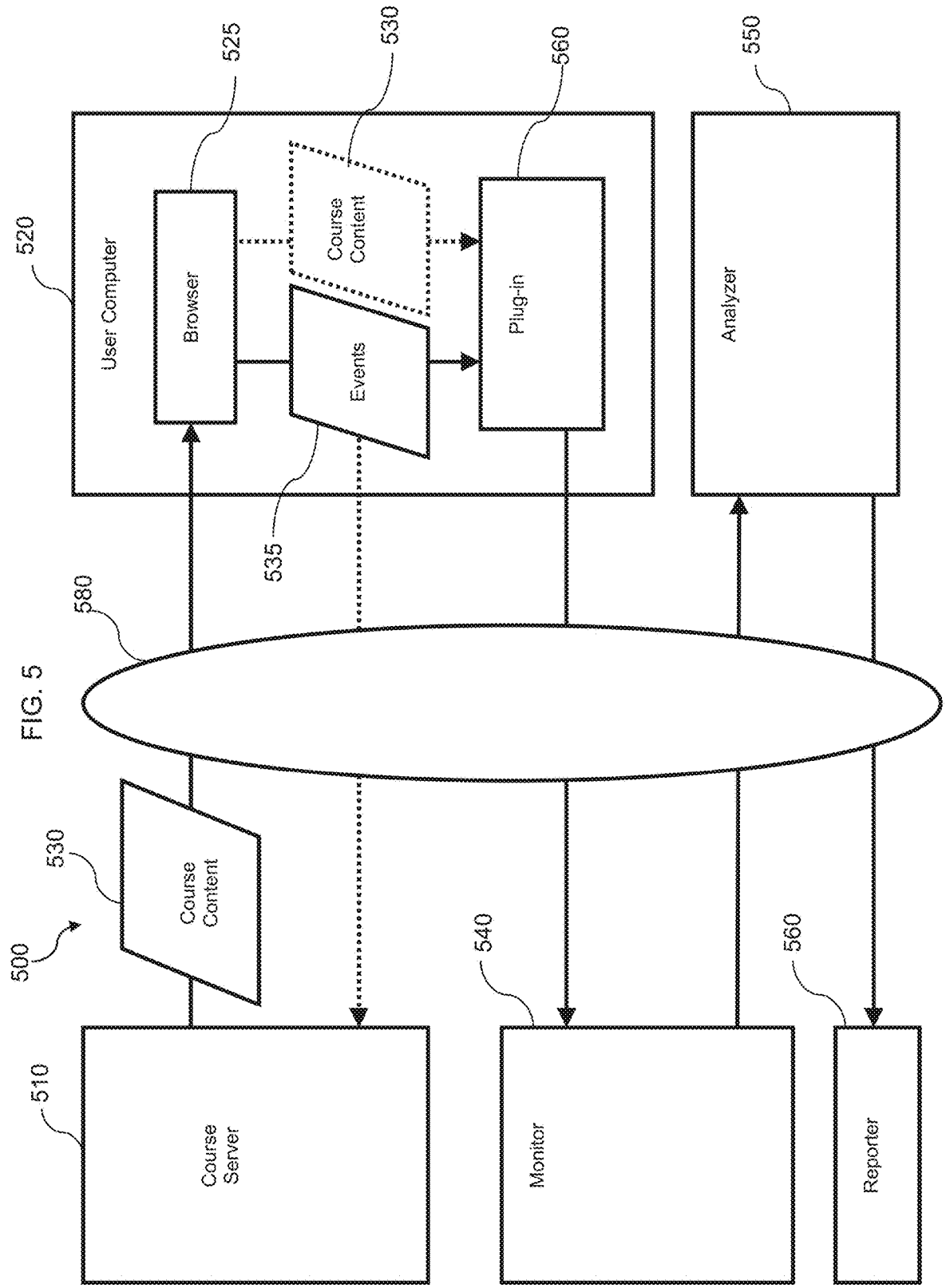

LiMS Learner Interaction Monitoring System logo

*Behavioral Tracking*

Navigation Bar

Student Overview

Course Overview

Quiz Overview

Compare Students

Compared Students

Andrew Belzer

Norman Gentile

Compared Courses

2010LiMS

Compared Results

Total Time in Course

Total Time in Content

---

*Student Overview*
*Here you will find courses, quiz results, and information pertaining to an individual student.*

*Course Overview*
*Here you will find courses, chapters, attempts, success and failure rates of a course and assessment.*

*Quiz Overview*
*Here you will find the quiz questions with the performance of the students and question statistics.*

*Compare Students*
*Here you will be able to compare students by course with select reports you can review.*

FIG. 6

LiMS — Learner Interaction Monitoring System

*logo*                                                                 *Behavioral Tracking*

| NUMBER OF STUDENTS | NUMBER OF FEMALES | NUMBER OF MALES | AVERAGE AGE | COMPREHENSION |
|---|---|---|---|---|
| *31* | *8* | *23* | *44* | *28%* |

SYSTEM IS WORKING

The system is up to date and working fine. If you notice any problems with the system if you could please submit a support ticket.

SUBMIT A SUPPORT TICKET

TOP STUDENTS

- *Student One*
- *Student Two*
- *Student Three*

GENERAL STATS

- BROWSER STATS
- USER INFORMATION
- GENERAL STATS

COURSES

- *Demo Course*
- *View All Courses*

ABOUT THIS SOFTWARE

- HOW TO USE
- HELP
- SUBMIT A SUPPORT TICKET

---

Help and Support

Lorem ipsum dolor sit amet, consectetuer adipiscing elit, sed diam nonummy nibh euismod tincidunt ut laoreet dolore magna aliquam erat volutpat.

Our Company

Lorem ipsum dolor sit amet, consectetuer adipiscing elit, sed diam nonummy nibh euismod tincidunt ut laoreet dolore magna aliquam erat volutpat.

LiMS is wholly owned by QUIZZICLE, LLC
All Rights Reserved

LiMS — Learner Interaction Monitoring System

STUDENT: JOHN S

READING SPEED POOR AT 21.43%
This person has not read WITHIN the acceptable range. Reading ABOVE the range means the user has 'skimmed' the text and their behavior does NOT indicate comprehension. Reading BELOW the range indicates EITHER a challenge in comprehension OR possible distraction while reading

TEST PERFORMANCE POOR AT 25%
A failing score indicates a poor understanding of concepts or content presented within the course. Multiple attempts at answering questions underscore this person's challenge with comprehending the course topic and can assist in reviewing specific challenges based on specific questions. Downloading or printing a Comprehension Report will provide further details

PAGE REVISIT POOR AT 71.43%
This person seems to have difficulty in recalling information. Comprehension requires a true understanding of concepts or processes. The need to revisit previous pages indicates the student did not fully grasp content or concepts necessary to complete tasks which build upon previously encountered knowledge

CONVICTION ACTION GOOD AT 75%
This person indicates success in making decisions based on a true understanding of a challenge

CONTENT DISCRIMINATION POOR AT 11.11%
This person does not take advantage of learning opportunities that require them to perform an action to experience. Optional learning opportunities afford the student the possibility of enhancing their understanding of concepts or processes. Not electing to engage these may indicate the student understands the topic without the need for additional information OR their level of interest may not match what is required for true comprehension

ENTER/EXIT FREQUENCY GOOD AT 100%
This person manages their time well. They minimize distractions and complete tasks within assigned time frames.

*Focus / Distraction*
*Inquisitive / Indiffere*
*Motivated / Disintere*
*Confident / Unsure*
*Comprehension / Mi*
*Enter / Exit Frequenc*

COMPREHEN

WHAT DO THES

Help and Support

Lorem ipsum dolor sit a sed diam nonummy nib dolore magna aliquam

SQL result

Host: localhost
Database: quizzicl_limsdatabase
Generation Time: Jun 24, 2014 at 05:38 PM
Generated by: phpMyAdmin 4.1.8 / MySQL 5.1.73-cll
SQL query: SELECT * FROM `elements` LIMIT 0, 25 ;
Rows: 25

| emid Element ID | pgid Page ID | quid Question ID | enam Element NAMe | etyp Element TYPe | etxt Element TeXT | epos Element Position | otyp Optional Type | ooco Open Optional Close Optional | twip Total Words in Popup | add |
|---|---|---|---|---|---|---|---|---|---|---|
| 1 | 1 | NULL | button929 | button | NULL | NULL | NULL | NULL | 0 | 1337776 |
| 2 | 1 | NULL | button926 | button | NULL | NULL | NULL | NULL | 0 | 1337776 |
| 3 | 1 | NULL | button927 | button | NULL | NULL | NULL | NULL | 0 | 1337776 |
| 4 | 2 | NULL | button928 | button | Back | NULL | NULL | NULL | 0 | 1337776 |
| 5 | 2 | NULL | button929 | button | Print | NULL | NULL | NULL | 0 | 1337776 |
| 6 | 2 | NULL | button927 | button | Next | NULL | NULL | NULL | 0 | 1337776 |
| 7 | 2 | NULL | button926 | button | Exit | NULL | NULL | NULL | 0 | 1337776 |
| 8 | 2 | NULL | Trivantis_radiovision_popup | window | javascript:var newWnd=ObjLayerActionGoToNewWindow(... | NULL | ho | NULL | 0 | 1337776 |
| 9 | 2 | NULL | button16529 | button | op_ao_closegroup | NULL | ao | og16515 | 0 | 1337776 |
| 10 | 2 | NULL | button16531 | button | op_ao_opengroup | NULL | ao | og16515 | 0 | 1337776 |
| 11 | 2 | NULL | hyperlink_1_2_6 | hyperlink | radiovision | NULL | ho | Trivantis_radiovision_popup | 0 | 1337776 |
| 12 | 2 | NULL | text32698 | textpop | text32698 | NULL | hp | NULL | 22 | 1337776 |
| 13 | 2 | NULL | hyperlink_1_2_9 | hyperpop | words | NULL | hp | text32698 | 0 | 1337776 |
| 14 | 2 | NULL | og16515 | group | og16515 | NULL | ao | NULL | 64 | 1337776 |
| 15 | 3 | NULL | button929 | button | Print | NULL | NULL | NULL | 0 | 1337776 |
| 16 | 3 | NULL | button926 | button | Exit | NULL | NULL | NULL | 0 | 1337776 |
| 17 | 3 | NULL | button928 | button | Back | NULL | NULL | NULL | 0 | 1337776 |
| 18 | 3 | NULL | button927 | button | Next | NULL | NULL | NULL | 0 | 1337776 |
| 19 | 4 | NULL | button928 | button | Back | NULL | NULL | NULL | 0 | 1337776 |
| 20 | 4 | NULL | button926 | button | Exit | NULL | NULL | NULL | 0 | 1337776 |

FIG. 17

SQL result

Host: localhost
Database: quizzicl_limsdatabase
Generation Time: Jun 24, 2014 at 05:38 PM
Generated by: phpMyAdmin 4.1.8 / MySQL 5.1.73-cll
SQL query: SELECT * FROM `captures` LIMIT 0, 25 ;
Rows: 25

FIG. 18

| caid Action ID | exid Experience ID | evid Event ID | emid Element ID | acid Action ID | beid Behavior ID | evlu Element Value | added Microtime |
|---|---|---|---|---|---|---|---|
| 1 | 1 | 6 | 3 | NULL | NULL | NULL | 1337776200906 |
| 2 | 1 | 13 | NULL | 1 | NULL | NULL | 1337776200945 |
| 3 | 1 | 19 | NULL | 3 | NULL | NULL | 1337776452498 |
| 4 | 1 | 25 | 3 | NULL | NULL | NULL | 1337776453219 |
| 5 | 1 | 17 | NULL | 4 | NULL | NULL | 1337776453716 |
| 6 | 1 | 26 | 3 | NULL | NULL | NULL | 1337776454532 |
| 7 | 1 | 19 | NULL | 3 | NULL | NULL | 1337776455638 |
| 8 | 1 | 25 | 3 | NULL | NULL | NULL | 1337776456645 |
| 9 | 1 | 3 | 3 | NULL | NULL | NULL | 1337776457302 |
| 10 | 1 | 7 | 3 | NULL | NULL | NULL | 1337776457394 |
| 11 | 1 | 1 | 3 | 5 | NULL | NULL | 1337776457396 |
| 12 | 1 | 16 | NULL | 2 | NULL | NULL | 1337776458027 |
| 13 | 2 | 26 | 6 | NULL | NULL | NULL | 1337776461406 |
| 14 | 2 | 25 | 6 | NULL | NULL | NULL | 1337776461525 |
| 15 | 2 | 13 | NULL | 1 | NULL | NULL | 1337776461526 |
| 16 | 2 | 19 | NULL | 3 | NULL | NULL | 1337776465816 |
| 17 | 2 | 25 | 10 | NULL | NULL | NULL | 1337776466158 |
| 18 | 2 | 3 | 10 | NULL | NULL | NULL | 1337776466260 |
| 19 | 2 | 1 | 10 | 6 | NULL | og16515 | 1337776466253 |
| 20 | 2 | 7 | 10 | NULL | NULL | NULL | 1337776466531 |
| 21 | 2 | 26 | 9 | NULL | NULL | NULL | 1337776468355 |
| 22 | 2 | 25 | 9 | NULL | NULL | NULL | 1337776468723 |
| 23 | 2 | 3 | 9 | NULL | NULL | NULL | 1337776468723 |

SQL result

Host: localhost
Database: quizzicl_limsdatabase
Generation Time: Jun 24, 2014 at 05:39 PM
Generated by: phpMyAdmin 4.1.8 / MySQL 5.1.73-cll
SQL query: SELECT * FROM `stat_student_page` LIMIT 0, 25 ;
Rows: 25

| id | stid | pgid | totalvisits | avgmsonpage | avgwordsreadpersec | avggroupsopenedratio | avgwindowsopenedratio | avgtextopenedratio | avgquestioninteractratio | avgnonquestionint |
|---|---|---|---|---|---|---|---|---|---|---|
| 1 | 1 | 1 | 1 | 257082 | 0.19 | NULL | NULL | NULL | NULL | NULL |
| 4 | 1 | 2 | 2 | 9391 | 8.95 | 50.00 | 0.00 | 50.00 | NULL | NULL |
| 5 | 1 | 3 | 2 | 5981 | 27.45 | NULL | NULL | NULL | NULL | NULL |
| 6 | 1 | 4 | 1 | 11885 | 8.75 | 100.00 | 0.00 | NULL | NULL | NULL |
| 7 | 1 | 5 | 1 | 32778 | 3.97 | NULL | NULL | NULL | NULL | NULL |
| 8 | 1 | 6 | 1 | 7766 | 9.92 | NULL | 0.00 | NULL | NULL | NULL |
| 11 | 1 | 7 | 2 | 30460 | 19.00 | NULL | 0.00 | NULL | NULL | NULL |
| 12 | 1 | 8 | 2 | 8259 | 7.83 | NULL | NULL | NULL | NULL | 25.00 |
| 13 | 1 | 9 | 1 | 12261 | 10.28 | NULL | NULL | NULL | NULL | 38.46 |
| 14 | 1 | 10 | 1 | 3454 | 60.51 | NULL | NULL | NULL | NULL | 40.00 |
| 15 | 1 | 11 | 1 | 7298 | 21.79 | NULL | NULL | NULL | NULL | 33.33 |
| 16 | 1 | 12 | 1 | 7585 | 15.69 | NULL | NULL | NULL | NULL | 50.00 |
| 17 | 1 | 13 | 1 | 2958 | 26.37 | NULL | NULL | NULL | NULL | NULL |
| 27 | 1 | 18 | 2 | 2762 | 14.01 | NULL | NULL | NULL | NULL | NULL |
| 28 | 1 | 14 | 3 | 4027 | 11.28 | NULL | NULL | NULL | 13.33 | NULL |
| 29 | 1 | 15 | 3 | 2341 | 19.15 | NULL | NULL | NULL | 50.00 | NULL |
| 30 | 1 | 16 | 3 | 2307 | 36.03 | 0.00 | NULL | NULL | 33.33 | NULL |
| 31 | 1 | 17 | 3 | 4105 | 9.55 | 33.33 | NULL | NULL | 41.67 | NULL |
| 32 | 1 | 19 | 1 | 2118 | 15.58 | NULL | NULL | NULL | NULL | NULL |
| 33 | 1 | 20 | 1 | 2827 | 27.24 | NULL | NULL | NULL | NULL | NULL |
| 34 | 1 | 21 | 1 | 11289 | 7.44 | NULL | NULL | NULL | NULL | 80.00 |
| 35 | 1 | 22 | 1 | 7904 | 5.31 | NULL | NULL | NULL | NULL | NULL |
| 36 | 2 | 23 | 1 | 6664 | 4.80 | NULL | NULL | NULL | NULL | 16.67 |

FIG. 19

SQL result

Host: localhost  
Database: quizzicl_limsdatabase  
Generation Time: Jun 24, 2014 at 05:39 PM  
Generated by: phpMyAdmin 4.1.8 / MySQL 5.1.73-cll  
SQL query: SELECT * FROM `stat_student_question` LIMIT 0, 25 ;  
Rows: 24

| id | stid | quid | numattempts | firstansw | msforfirstansw | finalansw | finalrslt | hintavailable | firstattempthintused |
|---|---|---|---|---|---|---|---|---|---|
| 9 | 1 | 1 | 2 | D) Television | 1904 | E) Radiovision | 1 | 0 | NULL |
| 10 | 1 | 2 | 2 | True | 1790 | False | 1 | 1 | NULL |
| 11 | 1 | 3 | 1 | farming conditions,weather conditions | 1634 | farming conditions,weather conditions | 1 | 1 | NULL |
| 12 | 1 | 4 | 3 | B) 120 | 1197 | C) 50 | 1 | 1 | 3 |
| 21 | 5 | 1 | 2 | A) Totalvision | 15438 | E) Radiovision | 1 | 0 | NULL |
| 22 | 5 | 2 | 2 | True | 1897 | False | 1 | 1 | NULL |
| 23 | 5 | 3 | 3 | politics,soap operas | 3924 | farming conditions,weather conditions | 1 | 1 | NULL |
| 24 | 5 | 4 | 3 | A) 1080 | 1249 | C) 50 | 1 | 1 | NULL |
| 25 | 6 | 1 | 1 | E) Radiovision | 5770 | E) Radiovision | 1 | 0 | NULL |
| 26 | 6 | 2 | 1 | True | 3879 | True | 0 | 1 | NULL |
| 27 | 6 | 3 | 1 | farming conditions,politics,weather conditions | 10226 | farming conditions,politics,weather conditions | 0 | 1 | NULL |
| 28 | 6 | 4 | 1 | D) 48 | 5526 | D) 48 | 0 | 1 | NULL |
| 33 | 13 | 1 | 1 | E) Radiovision | 4215 | E) Radiovision | 1 | 0 | NULL |
| 34 | 13 | 2 | 2 | True | 5219 | False | 1 | 1 | NULL |
| 35 | 13 | 3 | 1 | farming conditions,weather conditions | 11098 | farming conditions,weather conditions | 1 | 1 | NULL |
| 36 | 13 | 4 | 1 | C) 50 | 4526 | C) 50 | 1 | 1 | NULL |
| 37 | 15 | 1 | 1 | E) Radiovision | 1239 | E) Radiovision | 1 | 0 | 1 |
| 38 | 15 | 2 | 1 | False | 6588 | False | 1 | 1 | NULL |
| 39 | 15 | 3 | 1 | farming conditions,weather conditions | 1139 | farming conditions,weather conditions | 1 | 1 | 1 |
| 40 | 15 | 4 | 1 | C) 50 | 1133 | C) 50 | 1 | 1 | NULL |
| 45 | 19 | 1 | 1 | E) Radiovision | 9183 | E) Radiovision | 1 | 0 | NULL |
| 46 | 19 | 2 | 2 | True | 2957 | False | 1 | 1 | NULL |
| 47 | 19 | 3 | 1 | farming conditions,weather conditions | 9724 | farming conditions,weather conditions | 1 | 1 | 1 |

FIG. 20

SQL result

Host: localhost
Database: quizzicl_limsdatabase
Generation Time: Jun 24, 2014 at 05:40 PM
Generated by: phpMyAdmin 4.1.8 / MySQL 5.1.73-cll
SQL query: SELECT * FROM `pages` LIMIT 0, 25 ;
Rows: 23

| pgid PaGe ID | chid CHapter ID | scid SeCtion ID | pgnm PaGe NaMe | tvwp Total Visible Words on Page | groupcount | windowcount | textcount | questioncount | nonquestioncount | added |
|---|---|---|---|---|---|---|---|---|---|---|
| 1 | 1 | NULL | Course Observer | 49 | 0 | 0 | 0 | 0 | 0 | 1337776198355 |
| 2 | 2 | NULL | 1923 | 84 | 1 | 1 | 1 | 0 | 0 | 1337776461327 |
| 3 | 2 | NULL | 1925 | 112 | 0 | 0 | 0 | 0 | 0 | 1337776471314 |
| 4 | 2 | NULL | 1927 | 104 | 1 | 1 | 0 | 0 | 0 | 1337776493617 |
| 5 | 2 | NULL | 1928 | 130 | 0 | 2 | 0 | 0 | 0 | 1337776505907 |
| 6 | 2 | NULL | 1929 | 77 | 0 | 0 | 0 | 0 | 0 | 1337776541136 |
| 7 | 3 | NULL | FastForward | 95 | 0 | 1 | 0 | 0 | 0 | 1337776549571 |
| 8 | 3 | NULL | Golden Age | 57 | 0 | 0 | 0 | 0 | 12 | 1337776552712 |
| 9 | 3 | NULL | Variety Comedy Drama | 126 | 0 | 0 | 0 | 0 | 13 | 1337776632036 |
| 10 | 3 | NULL | Slogans | 209 | 0 | 0 | 0 | 0 | 5 | 1337776644673 |
| 11 | 3 | NULL | Talkies | 159 | 0 | 0 | 0 | 0 | 18 | 1337776648755 |
| 12 | 3 | NULL | 2000 | 119 | 0 | 0 | 0 | 0 | 8 | 1337776656459 |
| 13 | 3 | NULL | Test Introduction | 78 | 0 | 0 | 0 | 0 | 0 | 1337776664752 |
| 14 | 4 | NULL | Question 1 | 37 | 0 | 0 | 0 | 5 | 0 | 1337776668086 |
| 15 | 4 | NULL | Question 2 | 31 | 1 | 0 | 0 | 2 | 0 | 1337776674758 |
| 16 | 4 | NULL | Question 3 | 50 | 1 | 0 | 0 | 4 | 0 | 1337776678513 |
| 17 | 4 | NULL | Question 4 | 36 | 1 | 0 | 0 | 4 | 0 | 1337776683396 |
| 18 | 5 | NULL | Failed | 33 | NULL | NULL | NULL | NULL | NULL | 1337776686643 |
| 19 | 5 | NULL | Passed | 33 | NULL | NULL | NULL | NULL | NULL | 1337776719415 |
| 20 | 6 | NULL | Review | 77 | 0 | 0 | 0 | 0 | 0 | 1337776721883 |
| 21 | 6 | NULL | Notes | 84 | 0 | 0 | 0 | 0 | 5 | 1337776725099 |
| 22 | 6 | NULL | Go To Reports | 42 | 0 | 0 | 0 | 0 | 0 | 1337776736751 |

FIG. 21

SQL result

Host: localhost
Database: quizzicl_limsdatabase
Generation Time: Jun 24, 2014 at 05:41 PM
Generated by: phpMyAdmin 4.1.8 / MySQL 5.1.73-cll
SQL query: SELECT * FROM `captures` LIMIT 0, 25 ;
Rows: 25

| caid Action ID | exid Experience ID | evid Event ID | emid Element ID | acid Action ID | beid Behavior ID | evlu Element Value | added Microtime |
|---|---|---|---|---|---|---|---|
| 1 | 1 | 6 | 3 | NULL | NULL | NULL | 1337776200906 |
| 2 | 1 | 13 | NULL | 1 | NULL | NULL | 1337776200945 |
| 3 | 1 | 19 | NULL | 3 | NULL | NULL | 1337776452498 |
| 4 | 1 | 25 | 3 | NULL | NULL | NULL | 1337776453219 |
| 5 | 1 | 17 | NULL | 4 | NULL | NULL | 1337776453716 |
| 6 | 1 | 26 | 3 | NULL | NULL | NULL | 1337776454532 |
| 7 | 1 | 19 | NULL | 3 | NULL | NULL | 1337776455638 |
| 8 | 1 | 25 | 3 | NULL | NULL | NULL | 1337776456645 |
| 9 | 1 | 3 | 3 | NULL | NULL | NULL | 1337776457302 |
| 10 | 1 | 7 | 3 | NULL | NULL | NULL | 1337776457394 |
| 11 | 1 | 1 | 3 | 5 | NULL | NULL | 1337776457396 |
| 12 | 1 | 16 | NULL | 2 | NULL | NULL | 1337776458027 |
| 13 | 2 | 26 | 6 | NULL | NULL | NULL | 1337776461520 |
| 14 | 2 | 25 | 6 | NULL | NULL | NULL | 1337776461406 |
| 15 | 2 | 13 | NULL | 1 | NULL | NULL | 1337776461525 |
| 16 | 2 | 19 | NULL | 3 | NULL | NULL | 1337776461526 |
| 17 | 2 | 25 | 10 | NULL | NULL | NULL | 1337776465816 |
| 18 | 2 | 3 | 10 | NULL | NULL | NULL | 1337776466158 |
| 19 | 2 | 1 | 10 | 6 | NULL | og16515 | 1337776466260 |
| 20 | 2 | 7 | 10 | NULL | NULL | NULL | 1337776466253 |
| 21 | 2 | 26 | 9 | NULL | NULL | NULL | 1337776466531 |
| 22 | 2 | 25 | 9 | NULL | NULL | NULL | 1337776468355 |
| 23 | 2 | 3 | 9 | NULL | NULL | NULL | 1337776468723 |

FIG. 22

SQL result

Host: localhost
Database: quizzicl_limsdatabase
Generation Time: Jun 24, 2014 at 05:41 PM
Generated by: phpMyAdmin 4.1.8 / MySQL 5.1.73-cll
SQL query: SELECT * FROM `questions` LIMIT 0, 25 ;
Rows: 6

| quid | pgid | tsid | qnam | qtyp | qtxt | qans | hintavailable | added |
|---|---|---|---|---|---|---|---|---|
| 1 | 14 | 1 | qu336 | MC | Charles Francis Jenkins calls his early form of mo... | E) Radiovision | 0 | 1337776198345 |
| 2 | 15 | 1 | qu357 | TF | Charles Jenkins transmitted the first moving pictu... | False | 1 | 1337776198345 |
| 3 | 16 | 1 | qu6064 | MC | General Electric began regular TV broadcasting twi... | farming conditions,weather conditions | 1 | 1337776198345 |
| 4 | 17 | 1 | qu395 | MC | In 1929 color television was demonstrated at how m... | C) 50 | 1 | 1337776198345 |
| 5 | *NULL* | 2 | qu35779 | MC | What is the fifth letter in the alphabet? | E | 0 | 1337868460578 |
| 6 | *NULL* | 2 | qu35735 | TF | This is the second question of the second test. | False | 0 | 1337868460578 |

FIG. 23

SQL result

Host: localhost
Database: quizzicl_limsdatabase
Generation Time: Jun 24, 2014 at 05:41 PM
Generated by: phpMyAdmin 4.1.8 / MySQL 5.1.73-cll
SQL query: SELECT * FROM `chapters` LIMIT 0, 25 ;
Rows: 6

| chid CHapter ID | coid COurse ID | chtp CHapter TyPe | tpic Total Pages In Chapter | chnm CHapter NaMe | added |
|---|---|---|---|---|---|
| 1 | 1 | content | 1 | LiMS Data Capture | 1337776198355 |
| 2 | 1 | content | 5 | Television History | 1337776461327 |
| 3 | 1 | content | 7 | Television As Media | 1337776549571 |
| 4 | 1 | test | 4 | Course Test | 1337776668086 |
| 5 | 1 | content | 2 | PassFail | 1337776686643 |
| 6 | 1 | content | 3 | Complete | 1337776721883 |

SQL result

Host: localhost
Database: quizzicl_limsdatabase
Generation Time: Jun 24, 2014 at 05:48 PM
Generated by: phpMyAdmin 4.1.8 / MySQL 5.1.73-cll
SQL query: SELECT * FROM `events`;
Rows: 30

| evid Event ID | evnm Event Name |
|---|---|
| 11 | abort |
| 29 | beforeunload |
| 17 | blur |
| 18 | change |
| 1 | click |
| 32 | close |
| 2 | dblclick |
| 12 | error |
| 19 | focus |
| 27 | focusin |
| 28 | focusout |
| 8 | keydown |
| 9 | keypress |
| 10 | keyup |
| 13 | load |
| 3 | mousedown |
| 25 | mouseenter |
| 26 | mouseleave |
| 4 | mousemove |
| 6 | mouseout |
| 5 | mouseover |
| 7 | mouseup |
| 31 | pagehide |
| 30 | pageshow |
| 20 | reset |
| 14 | resize |
| 15 | scroll |
| 23 | select |
| 24 | submit |
| 16 | unload |

FIG. 26

| Table | Rows | Type | Size | Comments | |
|---|---|---|---|---|---|
| actions | 16 | MyISAM | 2.3 KiB | Creation: | Jun 24, 2014 at 05:33 PM |
| | | | | Last update: | Jun 24, 2014 at 05:33 PM |
| answers | 0 | InnoDB | 16 KiB | Creation: | Jun 24, 2014 at 05:38 PM |
| a_users | 1 | MyISAM | 2 KiB | Creation: | Jun 24, 2014 at 05:33 PM |
| | | | | Last update: | Jun 24, 2014 at 05:33 PM |
| captures | 5,547 | InnoDB | 304 KiB | Creation: | Jun 24, 2014 at 05:38 PM |
| chapters | 6 | MyISAM | 2.3 KiB | Creation: | Jun 24, 2014 at 05:33 PM |
| | | | | Last update: | Jun 24, 2014 at 05:33 PM |
| clients | 1 | MyISAM | 2.1 KiB | Creation: | Jun 24, 2014 at 05:33 PM |
| | | | | Last update: | Jun 24, 2014 at 05:33 PM |
| courses | 1 | MyISAM | 2 KiB | Creation: | Jun 24, 2014 at 05:33 PM |
| | | | | Last update: | Jun 24, 2014 at 05:33 PM |
| elements | 182 | MyISAM | 15.8 KiB | Creation: | Jun 24, 2014 at 05:33 PM |
| | | | | Last update: | Jun 24, 2014 at 05:33 PM |
| events | 30 | InnoDB | 32 KiB | Creation: | Jun 24, 2014 at 05:38 PM |
| experiences | 252 | MyISAM | 10.9 KiB | Creation: | Jun 24, 2014 at 05:33 PM |
| | | | | Last update: | Jun 24, 2014 at 05:33 PM |
| pages | 23 | MyISAM | 2.9 KiB | Creation: | Jun 24, 2014 at 05:33 PM |
| | | | | Last update: | Jun 24, 2014 at 05:33 PM |
| questions | 6 | InnoDB | 16 KiB | Creation: | Jun 24, 2014 at 05:38 PM |
| sections | 0 | MyISAM | 1 KiB | Creation: | Jun 24, 2014 at 05:33 PM |
| | | | | Last update: | Jun 24, 2014 at 05:33 PM |
| serials | 3 | MyISAM | 2.2 KiB | Creation: | Jun 24, 2014 at 05:33 PM |
| | | | | Last update: | Jun 24, 2014 at 05:33 PM |
| soc_help | 3 | MyISAM | 3.4 KiB | Creation: | Jun 24, 2014 at 05:33 PM |
| | | | | Last update: | Jun 24, 2014 at 05:33 PM |
| soc_standards | 14 | MyISAM | 5.8 KiB | Creation: | Jun 24, 2014 at 05:33 PM |
| | | | | Last update: | Jun 24, 2014 at 05:33 PM |
| soc_status | 1 | MyISAM | 2.2 KiB | Creation: | Jun 24, 2014 at 05:33 PM |
| | | | | Last update: | Jun 24, 2014 at 05:33 PM |
| soc_studresults | 18 | MyISAM | 2.7 KiB | Creation: | Jun 24, 2014 at 05:33 PM |
| | | | | Last update: | Jun 24, 2014 at 05:33 PM |

FIG. 27A

| Table | Rows | Type | Size | Comments | |
|---|---|---|---|---|---|
| Standards | 2 | MyISAM | 2 KiB | Creation: | Jun 24, 2014 at 05:33 PM |
| | | | | Last update: | Jun 24, 2014 at 05:33 PM |
| stat_client | 1 | InnoDB | 32 KiB | Creation: | Jun 24, 2014 at 05:38 PM |
| stat_course | 1 | InnoDB | 32 KiB | Creation: | Jun 24, 2014 at 05:38 PM |
| stat_course_agg_bev_text | 0 | MyISAM | 1 KiB | Creation: | Jun 24, 2014 at 05:50 PM |
| | | | | Last update: | Jun 24, 2014 at 05:50 PM |
| stat_element | 183 | InnoDB | 32 KiB | Creation: | Jun 24, 2014 at 05:38 PM |
| stat_experience | 270 | InnoDB | 128 KiB | Creation: | Jun 24, 2014 at 05:38 PM |
| stat_optional_experience | 49 | InnoDB | 16 KiB | Creation: | Jun 24, 2014 at 05:38 PM |
| stat_page | 23 | InnoDB | 32 KiB | Creation: | Jun 24, 2014 at 05:38 PM |
| stat_question | 4 | InnoDB | 32 KiB | Creation: | Jun 24, 2014 at 05:38 PM |
| stat_question_experience | 36 | InnoDB | 16 KiB | Creation: | Jun 24, 2014 at 05:38 PM |
| stat_student | 5 | InnoDB | 32 KiB | Creation: | Jun 24, 2014 at 05:38 PM |
| stat_student_course | 5 | InnoDB | 32 KiB | Creation: | Jun 24, 2014 at 05:38 PM |
| stat_student_page | 180 | InnoDB | 32 KiB | Creation: | Jun 24, 2014 at 05:38 PM |
| stat_student_question | 24 | InnoDB | 32 KiB | Creation: | Jun 24, 2014 at 05:38 PM |
| stat_student_test | 6 | InnoDB | 32 KiB | Creation: | Jun 24, 2014 at 05:38 PM |
| stat_student_test_experience | 12 | InnoDB | 16 KiB | Creation: | Jun 24, 2014 at 05:38 PM |
| stat_test | 1 | InnoDB | 32 KiB | Creation: | Jun 24, 2014 at 05:38 PM |
| students | 18 | MyISAM | 3 KiB | Creation: | Jun 24, 2014 at 05:33 PM |
| | | | | Last update: | Jun 24, 2014 at 05:33 PM |
| studsessions | 19 | MyISAM | 3.4 KiB | Creation: | Jun 24, 2014 at 05:33 PM |
| | | | | Last update: | Jun 24, 2014 at 05:33 PM |
| tests | 2 | MyISAM | 2.1 KiB | Creation: | Jun 24, 2014 at 05:33 PM |
| | | | | Last update: | Jun 24, 2014 at 05:33 PM |
| 38 tables | 6,945 | -- | 965.1 KiB | | |

FIG. 27B

LEARNER INTERACTION MONITORING SYSTEM

CROSS-REFERENCE TO RELATED APPLICATIONS

This patent application claims the benefit of, under Title 35, United States Code, Section 119(e), U.S. Provisional Patent Application No. 61/503,810, filed Jul. 1, 2011, the content of which is incorporated herein by reference.

FIELD OF THE INVENTION

The present invention is directed to a learner interaction monitoring system, which captures the behaviors of online learners and evaluates online training courses.

BACKGROUND OF THE INVENTION

Businesses around the world are increasingly recognizing the need to support continuous professional development and skills acquisition and foster lifelong learning in their workforce, in order to maintain competitiveness in the global marketplace. Many have recognized the potential benefits of online training and education: the flexibility offered by the web-based learning environment allows working adult learners to engage with course materials "any time, any place, any path, any pace". Well-designed online training courses promise to make education and training available in ways that fit the busy work and life schedules of employees, and almost two decades of research into online learning has demonstrated that there is no measurable significant difference in learning outcomes between face to face and online learning modalities. In the corporate context, where exam results and course grades rarely exist as measures of learner achievement or effective online course design, it falls to training and education managers to identify reliable and valid approaches to evaluating both course design and learner performance, in order to demonstrate a significant return on the sizable investments needed to implement high quality online learning. Unfortunately, few easily implementable approaches exist. As has been noted, "in spite of the best efforts of organizations and the professional trainers' associations, there are significant problems in evaluating the true impact of [online] training".

Similarly, while the value of feedback from and to learners in educational settings is well-established, most corporate training departments lack the tools to gather accurate learner feedback (direct or indirect) about their online learning experience or activities. Such information is critical in evaluating whether training courses are meeting corporate educational needs and goals. In the absence of evaluative tools that return meaningful and easily interpretable data, corporate training departments are more likely to deliver web based courseware that simply reflects budgetary restrictions, rather than appropriate and evidence-based instructional design.

U.S. Pat. No. 7,131,842 to Hollingsworth, et al. disclose a method for measuring the effectiveness of a school's educational program. The method involves observing classroom teaching of students at the institution, and analyzing the observed teaching to determine effectiveness based on teacher time on task, teacher instructional effectiveness, alignment of student work to standards, and breadth of coverage of student work. However, Hollingsworth, et al. is directed to analyzing teaching and student work a traditional classroom environment, and does not teach capturing user interactions with a course delivery interface during online learning. The method does not incorporate real-time and/or ongoing analysis, but rather, only analyzes collected data after the observation is complete.

U.S. Patent Application Publication No. 2011/0167013 to Pogue, et al. discloses a method of online classroom quality control involving monitoring the interaction between an online instructor and online students to determine quality of teaching. However, Pogue, et al. is primarily directed toward evaluating the performance of an instructor, and the criteria used for establishing performance include only pass rate, grades, survey results, student and teacher log-in amounts and participation. Pogue et al. is not directed to utilizing event capture to derive behavioral observations relating to course design, to granular response latency relating to dilemma and behaviors that serve an automatic function, or user interactivity with secondary resources.

U.S. Patent Application Publication No. 2010/0291528 to Huerta discloses a monitoring device configured to capture real-time participant events and stimuli in a learning environment. However, the data capture is primarily audio-visual, and the device is directed primarily to natural language interpretation of speech and analyzing biometric information in a live classroom environment to evaluate the performance of a teacher by identifying educational strategies. Huerta is not directed to an online learning environment, and does not teach capturing user interactions with a course delivery interface during online learning.

U.S. Patent Application Publication No. 2010/0190143 to Gal, et al. discloses a system which monitors, logs, and reports the performance of students based on their operation of molecular digital learning objects at a workstation. The system may determine whether objectives are completed within defined time periods, whether certain percentages of questions are completed correctly, or whether a student has not operated a keyboard or mouse for a particular time period. However, Gal, et al. is not directed to utilizing event capture to derive behavioral observations relating to course design, to granular response latency relating to dilemma and behaviors that serve an automatic function, or to user interactivity with secondary resources.

U.S. Patent Application Publication No. 2009/0035733 to Meitar, et al. discloses a computer program for monitoring the progress of tutors and students in a classroom environment. Meitar et al. teach allocation of learning activities to students stored data relating to scoring and timing of student testing. However Meitar et al. is not directed to utilizing event capture to derive behavioral observations relating to course design, to granular response latency relating to dilemma and behaviors that serve an automatic function, or to user interactivity with secondary resources.

A U.S. Patent Application Publication No. 2005/0053908 to Satheesh, et al. discloses a computer program for monitoring the progress of tutors and students in a classroom environment. Satheesh et al. teach the analysis of stored data relating to scoring and timing of student testing. However, Satheesh et al. is not directed to utilizing event capture to derive behavioral observations relating to course design, to granular response latency relating to dilemma and behaviors that serve an automatic function, or to user interactivity with secondary resources.

SUMMARY OF THE INVENTION

Accordingly, it is an object of the present invention to provide a system and method for monitoring user interactions with an interactive learning system which overcome these deficiencies.

These and other objectives are achieved by providing a system for monitoring a course of study including a server computer; a network; a user computer in communication with the server computer over the network; software executing on the server computer to transmit a course of study to said user computer over the network; software executing on said user computer to receive the course of study from said server computer and to present the course of study to a user of said user computer; software executing on said user computer to capture an interaction of the user with the course of study as interaction data; and an analysis module receiving the interaction data and generating a behavioral observation using the interaction data.

In some embodiments, a second interaction of the user with the course of study is captured as second interaction data; and, the behavioral observation is generated using both the interaction data and the second interaction data.

In some embodiments, a second interaction of the user with the course of study is captured as second interaction data; and, a second behavioral observation is generated using both the interaction data and the second interaction data.

In some embodiments, the analysis module compares the interaction data with baseline data to generate the behavioral observation.

In some embodiments, the course of study is presented to a user of the user computer using a web browser.

In some embodiments, the user interactions with the course of study are captured using a web browser plug-in.

In some embodiments, the interaction data includes event data and timestamp data.

In some embodiments, the analysis module determines a reading time based upon the interaction data.

In some embodiments, the analysis module compares the reading time with baseline data to generate the behavioral observation.

In some embodiments, the behavioral observation reflects that the user is having trouble understanding a reading passage if the reading time is greater than a baseline reading time.

In some embodiments, the behavioral observation reflects that a reading passage is problematic if a reading time for more than one user is greater than a baseline reading time.

In some embodiments, behavioral observation reflects that the user is devoting insufficient time to a task if the reading time is less than a baseline reading time.

In some embodiments, the analysis module determines a response latency based upon the interaction data.

In some embodiments, analysis module compares the response latency with baseline data to generate the behavioral observation.

In some embodiments, the behavioral observation reflects that the user is experiencing a dilemma if the response latency is greater than a baseline response latency.

In some embodiments, the analysis module determines if a user has accessed a resource.

In some embodiments, the analysis module generates a behavioral observation based upon whether the user has accessed the resource.

In some embodiments, the analysis module generates a behavioral observation based upon whether the user has performed an additional interaction subsequent to accessing the resource.

In some embodiments, the behavioral observation reflects that the user is disinterested in the resource if the user has not accessed the resource.

In some embodiments, the analysis module updates the baseline data based upon the behavioral observation.

In some embodiments, the analysis module updates the baseline data to create updated baseline data based upon a second behavioral observation of a second user.

In some embodiments, the system includes a reporting module receiving the behavioral observation from the analysis module and generating a report using the behavioral observation.

In some embodiments, the report comprises a behavioral grade based on the behavioral observation.

In some embodiments, the report comprises a descriptive profile of the user.

In some embodiments, the report comprises a comparison among more than one user.

In some embodiments, the course of study comprises text, a test, a quiz, or an examination.

In some embodiments, the analysis module comprises software executing on an analysis computer that is in communication with the user computer over the network.

In some embodiments, the analysis module comprises software executing on the server computer.

In some embodiments, the analysis module comprises software executing on the user computer.

Other objects of the present invention are achieved by providing a system for monitoring a course of study including a first computer; presentation software executing on the computer to present a course of study to a user; interactions between the user and the first computer which relate to the course of study; analysis software executing on the first computer and analyzing the interactions to generate behavioral observations; and, reporting software executing on the first computer to generate a report of the behavioral observations.

In some embodiments, the presentation software, the analysis software, or the reporting software executes on a second computer in communication with the first computer.

Still other objects of the present invention are achieved by providing method of monitoring a course of study by providing a user computer; presenting a course of study to a user of the user computer using presentation software executing on the computer; monitoring user interactions with the course of study using monitoring software; analyzing the user interactions with the course of study to generate behavioral observations using analysis software.

In some embodiments, the user computer is connected to a network and the course is transmitted to the computer from a server computer.

In some embodiments, the system presents the behavioral observations as a report using reporting software.

In some embodiments, the behavioral observations are used to modify the course of study.

In some embodiments, the behavioral observations are used to modify the course of study while the course of study is in progress.

In some embodiments, the behavioral observations are used to modify the course of study with respect to other users of the course of study.

To meet the need for a robust web-based training evaluation tool, we have developed the Learner Interaction Monitoring System (LiMS) application. LiMS is a two-part web-based plug-in application that can interface with any web-based course delivery platform to transform the online learning environment into an active observer of learner engagement with course materials. Unlike the minimalist tracking tools packaged with standard Learning Management Systems (LMSs), LiMS purposely captures fine-grained data on learner activity and behaviors within the learning environment, turning the course itself into an active receiver of indirect learner feedback. Given that most web-based corporate training is self-paced, self-directed and is not instructor-led, this capacity already makes LiMS unique.

Typically, LMSs capture only very limited learner performance data such as student scores and course completion status. At best, such data merely demonstrate base-level learner participation. Until recently, this has been sufficient in the business environment, where the primary role of an online course has been to satisfy regulatory training requirements.

While some LMSs now capture and archive more extensive learner tracking data, they offer only very limited data reporting options, and access to archived data has only been possible via slow and cumbersome manual processes. Even more problematic is the reality that existing commercial LMSs provide little or no guidance for educators and managers to indicate which (if any) of the captured tracking variables may be pedagogically meaningful—that is to say, which of the available data points are indicative of student participation in educationally purposeful activity that may contribute to their learning or success. Today, training administrators are nevertheless expected to evaluate learner competence and course effectiveness by examining primitive or largely inaccessible data sets, in the absence of any interpretive guidance.

The Learner Interaction Monitoring System (LiMS) now offers administrators a means of capturing rich and detailed real-time information about individual learner behaviors in an online learning environment, and makes use of evidence-based interpretive approaches to permit meaningful evaluation of learners and courses. As has been recognized, " . . . you can always choose not to analyze data you have collected, but you can never analyze what you do not collect". Most LMSs fail to collect data that can reveal information about both learners and course design. By collecting user course engagement events, such as mouse clicks or movements acting upon individual page elements such as buttons, checkboxes and lists, LiMS ensures that the detailed course interaction data of the user experience is captured for reference. Going far beyond the capture of simple event sequencing, LiMS also captures data reflecting the variable behavioral characteristics of those actions such as duration, timing and response latency. Much like a teacher in a live classroom, LiMS virtually "watches" what the student is doing in an online class and commits those actions to memory by recording the behavioral data to an SQL database. Importantly, LiMS implementation and continuing development builds on existing research to permit pedagogically meaningful interpretation of captured data.

LiMS leverages a growing body of research confirming the relationships between online behaviors and learner performance, and builds on the resultant understanding that learner behavior in online learning environments offers a rich source of indirect feedback on both their learning strategies and experience, and effectiveness of course design.

In the past decade, the field of 'academic analytics' has emerged, as a small number of investigators have begun to employ business intelligence tools and processes in the analysis of data sets captured by institutional LMSs. Studies of interactive, instructor-facilitated online courses in the higher education sector have begun to demonstrate significant positive correlations between selected simple measures of student engagement with online course content, tools and peers, and a student's ultimate achievement in a course, as measured by final course grade. While this work has highlighted the real relationships between online behaviors and learner performance, the level of individual learner analysis remains crude. Moreover, the cited studies reveal that in the group-study contexts of higher education, learner-learner interaction measures are the best predictors of success. Continuing work in this line has less to offer the world of self-directed online education and training.

LiMS builds upon the basic findings of academic analytics, and extends these to the world of online corporate training by developing a detailed map of an individual learners engagement with online course materials, coupled with evidence-based interpretation.

In face-to-face training environments, educators intuitively evaluate learners or lessons by observing learner activity and reactions. Learners may demonstrate interest in a subject, for example, by contributing verbal comments or by identifying themselves as eager to participate by raising their hand. Disinterested or disengaged learners are often quiet, and reluctant to engage in dialogue. Proponents of alternate assessment approaches propose that multiple behavioral indicators can and should be employed to evaluate learner performance and the effectiveness of teaching methods. They point to psychological research that supports pedagogically meaningful interpretation of a range of learner behaviors. Such research suggests that in the classroom, as well as online, the timeliness and sequence of a learner's actions contribute to an individual's learning profile. They argue that motivated educators can make use of such observations to adjust their teaching techniques and approach in order to better engage the quiet or struggling student, as well as to acknowledge and further challenge the interested. To date, visual observation of learner engagement has been largely unavailable in asynchronous learner-directed online training environments.

We contend that new methods of capturing learner behavior data, such as the online behaviors recorded by LiMS, can provide some of the same valuable information as live teacher observation and can permit richer more fine-grained evaluation of learner performance online. The separation in space and time between the learner and teacher (or instructional designer) in distance learning contexts, first characterized as 'transactional distance', is routinely positioned as problematic. However, in online learning environments this exact condition of relative isolation may permit revelation of the learner's "true self" and allow individuals to express "phenomenally real aspects of self not often or easily expressed to others." In the un-monitored isolation of a self-directed online course, the supposedly unobserved actions of a learner may reveal behavioral information that is much more reliable than data collected via self-reporting and self-evaluation mechanisms.

"Data by itself is not information. For [an] evaluation to be credible, it has to inform and have an impact."

In a LiMS-enabled learning environment, start time is captured as soon as a learner opens a web-based course page. All elements (radio buttons, text boxes, hyperlinked text, etc) are identified on the page and reported to the database. For comprehensive elements (select boxes, list boxes, etc) each possible individual selection is recorded as an attribute of that parent element. All text (initially visible) is word counted, to allow calculation of a predicted reading completion time. Each 'event'—mouse click, mouse-over, response change—is captured and the time noted, to establish whether the event was 'early' or not. Hyperlinked URLs are captured when the text is selected—'time opened' is stamped (as well as 'time closed', to establish length of time of event). When elements are interacted with by the mouse, the duration of the event is captured and a 'behavior' is assigned to that duration (i.e. pause, hover, etc).

At the completion of each online training experience, LiMS assigns a 'behavioral grade' to the learner reflecting their approach to the training material when compared to a standard established by LiMS itself. At course completion, each learner, by default, is assigned a beginning learning behavioral grade of A+. As the learner's course behavior is reviewed by the LiMS engine, the grade is impacted by interpretation of captured criteria: 1.) Did the learner consistently read all of the text on each page? 2.) Did the learner access optional content when available? 3.) Did the learner answer all questions correctly? 4.) Did the learner access optional content that offered guidance to answering questions correctly? 5.) Did the learner adjust their behavioral approach during the course thereby positively impacting their performance?

LiMS adjusts the learner's grade using an algorithm that computes a final assigned 'grade' reflecting their behavioral approach to online training materials.

A descriptive profile of the learner is generated based on the course grade and the behavioral data, and is posted on the student's report page. For example, text-based reported may include statements such as: "Student X rarely accesses optional data even when it might result in performance improvement".

LiMS implementation can then be customized to allow educational designers to ask targeted questions about learner choices within a course, or to track learner behavior in relation to key course material items or events of interest. In relation to learner behaviors, for example, educators may wish to ask questions such as: Are learners spending sufficient time reading particular core course text materials? Do my learners display differential response latency to key questions, and can this provide insight into comprehension or decision making style? Additional comparison measures permits benchmarking against peers or course norms.

Example: Reading Time

The time interval between reading completion and initiation of a sequential event (for example, completion of a quiz), may be a useful discrepancy indicator in learner or course evaluation. Native speakers of English in North America typically read at a rate of 250-300 words per minute, when reading for comprehension. LiMS assumes a baseline reading rate of 300 words per minute, or 5 words per second, allowing the calculation of predicted reading time for all text-based course materials. As a learner moves through web-based course text, LiMS not only captures reading times for text blocks, but offers interpretive analysis describing whether a learner appears to be proceeding normally, too slowly or too quickly through reading materials. Such information can then be considered in relation to learner performance (if reading is apparently completed 'too quickly', is a learner giving insufficient time to the task?) and to course design (if learners regularly take too much time on selected text blocks, do these need rewriting for clarity?).

Example: Response latency

Similarly, response latency may also function as a discrepancy indicator. Research suggests, for example, that response latency "may be a useful measure for behaviors that serve an automatic function". That is to say, where response to an item (for example, a quiz question), is slow (shows increased response latency), it can be hypothesized that the responder (the learner) is experiencing a dilemma. Consider, for example, a web based Ethics course in which a learner is asked to make a decision about whether or not to accept a small gift from a vendor despite company policy strictly forbidding gifts. Reading the question and selecting an answer is expected to take no more than 12 seconds, whether the learner agrees with the statement or not. If the time to complete the task falls within the expected time period, then the learner can be assumed to be committed to their answer, regardless of their selection. If the task completion time was longer than expected, we might infer a struggle in choice selection, indicating a cognitive or behavioral dilemma.

In this scenario, there may be value in investigating why the learner took extra time answering the question. Research has demonstrated, for example, that response time for wrong answers is longer than for correct answers and that "respondents holding unstable attitudes need more time to respond to an opinion question than respondents who hold stable attitudes." Further investigation may be needed to discover whether course materials explaining company policy are insufficiently clear, or whether a particular learner is in genuine disagreement with or confusion about the policy.

Example: Using Additional Resources

Continuing with the above scenario, suppose the question was reconstructed as: 'Would you consider accepting a gift under $100 from a vendor?' This time the organization's policy information about receiving gifts is hidden in a popup window. A button labeled "additional information" is included on the page that, once selected, reveals the organization's gift receiving policy. This additional interactive option introduces the possibility of considering additional behavioral indicators: Did the learner display interest in "additional information"? If selected, was the additional content open long enough to be read or closed instantly? If the button was not selected, what was the sequential action? In other words, adding additional learning resources offers greater potential for behavior tracking and interpretation.

Integrating course materials and learning activities into online courses using more sophisticated media and tools (linked resources, multi-media, interactive activities) not only engages learners more effectively, but it also creates richer and more sophisticated opportunities to capture business intelligence and gain insight into learner behavior and course effectiveness. Highly interactive courses are more expensive to design and implement. Failure to follow evidence-based instructional design principles, however, not only reduces educational effectiveness but also means that meaningful opportunities for real-time learner performance and course evaluation are lost.

Conclusions

The supposedly unobserved nature of the learner experience in the online training and education environment affords unique possibilities for evaluation. Capturing the sequence, duration and timing of user interactions with course materials and learning opportunities in real-time permits the development of a learning behavioral profile of each individual, and interpretive metrics can be run on the performance of individuals, groups, and course content and structure. Collection and analysis of robust data sets permits greater intelligence, responsiveness and reactivity to be integrated into web-based courses. LiMS paves the way to fully evaluating students and courseware with data resources to support robust training development that is at once engaging, productive and fiscally valuable.

Moreover, we believe that there is enormous potential for real-time intervention within a course that is "LiMS enabled". As the observer of student interactions, LiMS data can provide the resources for a course to become a 'coach' or learning facilitator. By accessing captured student behavioral data the possibility exists to programmatically customize the online training environment in real-time, thereby adjusting the manner in which content is presented on screen or altering the functionality of a course.

As has been noted, if the expense of online training cannot be validated "those investments in training will be more likely [sic] rejected by the organization's senior management."

LiMS provides important justification for the budgets necessary to build dynamic courses in supportive environments. It provides a solid and multidimensional route to a more effective demonstration of ROI by coupling its analytic and interpretive capabilities to well designed interactive courseware and allow educational managers to mine the resultant intelligence. Early adopters of LiMS are working with our programmers and interface designers to enhance the presentation of behavioral data, as we continue to refine the tool.

Other objects of the invention and its particular features and advantages will become more apparent from consideration of the following drawings and accompanying detailed description.

BRIEF DESCRIPTION OF THE DRAWINGS

FIG. 5 is a block diagram of still a further example system illustrating aspects of the invention.

FIG. 6 is an illustration of an example reporting dialog according to aspects of the invention.

FIG. 8 illustrates another example reporting dialog according to aspects of the invention.

FIG. 12 illustrates another example reporting dialog according to aspects of the invention.

FIG. 13 illustrates another example reporting dialog according to aspects of the invention.

FIG. 14 illustrates an example course participant interaction dialog illustrating aspects of the invention.

FIGS. 17-27 illustrate example database tables according to aspects of the invention.

DETAILED DESCRIPTION OF THE INVENTION

Figure 1:
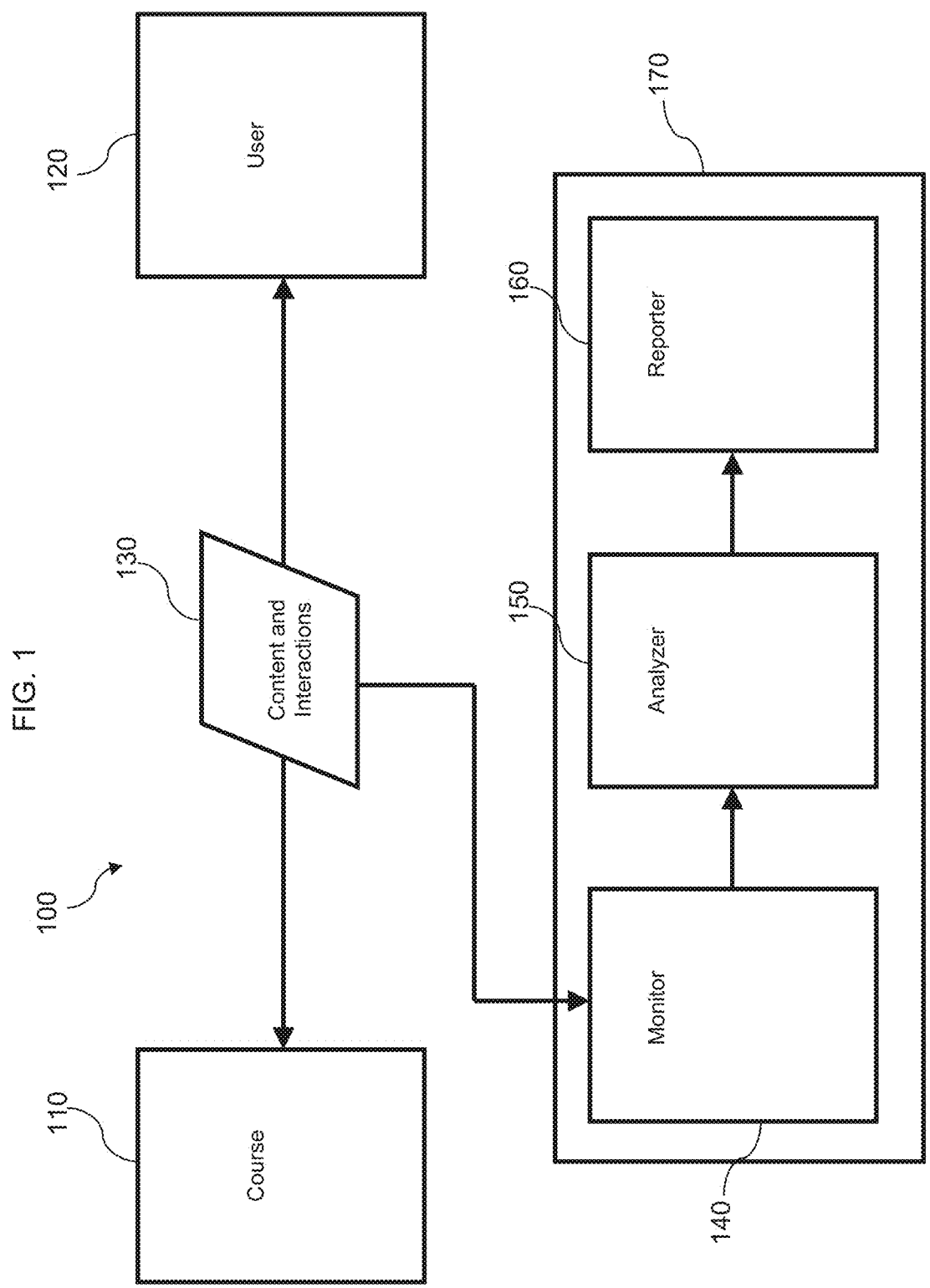
FIG. 1 is a block diagram of an example system illustrating aspects of the invention.

FIG. 1 is a block diagram of an example system 100 illustrating aspects of the invention. System 100 is directed to presenting an interactive course of study to a user and analyzing the user's behavior with respect to the course of study using captured events. User interface 120 can communicate with an interactive learning application 110 by receiving and transmitting course content and interaction data 130. For example, the application 110 can present content to user interface 120, and the user can interact with the content using the user interface 120. The user's interactions are transmitted back to the application 110. System 100 may be implemented using various combinations of computer hardware and software as well as various computer communications networks as is known in the art.

Content and interactions 130 are also acquired by Learner Interaction Monitoring System (LIMS) 170. LIMS 170 includes a monitoring function 140, an analyzing function 150, and a reporting function 160.

In an example operation, monitoring function 140 acquires the content and stores attributes of the content. For example, if the content is a block of text, monitoring function 140 may store the number of words. Monitoring function 140 also acquires user interaction events with the content, for example, by recording the presentation of content to the user, mouse clicks on page elements such as buttons, checkboxes and lists, other mouse events, scrolling events, keystrokes, and other event objects, as well as a timestamp for each. This timestamp can reflect either an actual time, system time, or a time relative to other monitored events, and may be implemented as an event handler. Monitoring function 140 may store the content and event data in a database such as an SQL database.

Analyzing function 150 analyzes the data acquired by the monitoring function 140, and uses this information to generate behavioral observations about the user's interaction with the course material. For example, analyzing function 150 may assign a baseline reading rate for a passage based on the number of words stored by monitoring function 140. Typically, this will be 300 words per minute for a native speaker of English in North America. Analyzing function 150 may also calculate the time the user spent reading the passage as the difference in timestamp values between the time at which the reading passage was presented to the user and the time at which the user clicked a button to move on from the reading passage using a mouse, for example. By comparing the time required to read the passage with the baseline reading rate for the passage, the analyzing function 150 can generate a behavioral observation. For example, if the reading time was less than the baseline, it may be observed that the reader is not devoting sufficient time to the task.

In some applications, the various baselines used by analyzer 140, and behavioral observations about the user derived from the baselines, can be adjusted in real time as data is acquired during the operation of system 100. For example, if analyzer 140 initially determines that a user is devoting insufficient time to reading a passage because the user's reading completion time is less than the baseline, this determination can later be updated if the user's reading rates for later passages are consistent with the reading rate for this passage, and if the user's scores for quizzes subsequently taken by the user relating to the passages are consistent with a thorough understanding of the material.

In this example case, a passage which the user was initially determined to have properly read for understanding based on comparison of the reading time to the baseline may later be determined to have been poorly designed or difficult for the user to understand. This may be due to the fact that even though this course participant read the passage in a time consistent with the baseline, the user's reading time was longer than the user's particular adjusted baseline reading rate, and therefore, the user was in fact spending more time than usual trying to understand the passage.

Analysis function 140 can also assign a behavioral grade to the user at the end of the course based upon the behavioral observations made during the course. The behavioral grade reflects an assessment of the user's behavioral approach to the course materials. For example, the user can initially be assigned the highest possible grade by default, with grade deductions for behavioral observations which reflect that the user did not consistently read all of the text presented, did not access optional content where available, did not answer all questions correctly, did not access optional content that offered guidance to answering questions correctly, or did not adjust their behavioral approach during the course to positively impact their performance, for example. These observations are simply examples, and many other types of behavioral observations can be used to determine a behavioral grade.

The analysis function may also keep track of information that is not behaviorally specific in this context, such as raw scoring data for quizzes. This information can then be captured in real time or obtained from other components of the system after the course is completed by the user. This information can be used by the analysis section in combination with other information to generate behaviorally specific information and/or observations. For example, a particular score on a quiz question may not be considered to be behaviorally specific in a given context, but if this information provides insight into the reasons for a user's reading time for a related passage of text, it can be used to distinguish whether a behavioral observation that either the user is struggling with the material, or that the passage of text is worded in such a way as to be difficult to understand is appropriate.

Reporting function 160 receives behavioral observations and optionally a behavioral grade generated by analysis module 150, and generates reports based on the received information.

Reports may include a descriptive profile of the learner that is generated based on a course grade and the behavioral data. For example, the descriptive profile may include statements such as: "Student X rarely accesses optional data even when it might result in performance improvement." This statement would be an appropriate behavioral observation if the reporting function 160 receives information from the analysis function 150 indicating that the user did not access the optional data when given the opportunity, and that the user subsequently did not correctly answer quiz questions relating to this material, for example.

Optionally, the reports may contain some or all of the behavioral observations for a given user relating to course content 130, for all courses taken, or for a subset of all courses taken, for example. The reports may also contain non-behaviorally specific information relating to quizzes taken, and/or other specific observations for the student.

Further, the reports may optionally contain a comparison of behavioral observations for all users using the course content 130, or a subset of all of the students compared. The reports may compare how much time each student spent taking a course, how much time each student spent taking a quiz, course or quiz grades, an overall course or user effectiveness rating, and other such comparisons. The comparison data may be presented as raw data or may be presented graphically using charts and diagrams.

The reports may also show a success to failure rate of the users of a course overall and by elements of the course. For example, success rates can be displayed by course, chapter, or attempts for a given user.

The reports may also provide a quiz overview displaying the performance of the students on a quiz in whole or in part, statistics for each question, derived effectiveness of the question based on score and behavioral observations of all users, and other observations.

The following table lists example learning behaviors that can be observed by the system, and example ways in which the observations are made by the system, for example, by event capturing:

| Learning Behaviors | Based on scored and weighted actions | Measurement |
|---|---|---|
| Focus/ Distraction | Text Reading Approach | Reading Speed (words per second) initially measured against 5.5 words per second standard. Subsequently measured against an Individualized Comprehension Standard (ICS). The ICS is based on a personal average aggregate reading rate directly correlating to personal topic/concept comprehension. The ICS establishes both a range for speed and similarity of approach (when experiencing text of near equal construction) and meeting the ICS indicates focus. |
| | Navigation | Courses are ideally constructed to present concepts and content to enable a scaffolding of knowledge - with an expectation of a sequential learning approach. Course navigation is thereby expected to be sequential (page one, page two, page three, etc.), with minimal intra-directional navigation (page one, page two, page three, page two). Intra-directional navigation indicates lack of focus/attention as well as a possible need to revisit information experienced earlier OR an issue in experiencing concepts/content in opposition to Instructional Design. |
| | Web Browser | eLearning courses are experienced through the web browser environment. Additional web windows (child windows) may be spawned from the course window (parent, but the learner is not expected to leave the browser environment unless they exit the course. Leaving the browser environment to engage other applications indicates multi-tasking rather than a preference to stay on-task. |
| | Seat Completion | Seat time indicates the length of time the learner takes to complete a single course. Courses ideally are |

| Learning Behaviors | Based on scored and weighted actions | Measurement |
|---|---|---|
| | | developed to be completed in one "seating". Multiple exits and entrances into a course (multiple seating experiences) indicate and inability to complete a course in a focused, time managed manner. |
| | Task Completion | During a course a learner is both required and requested to complete certain tasks. Completing tasks indicates a focus on bringing assignments to a close. Measured tasks include closing opened child browser windows, completing optional assessments (likert ratings) other survey style challenges (fill-in-blank). |
| | Response Time | Interaction Response Time (IRT) represents the optimal time required (as a range-of-time standard) to understand a challenge, make a decision and act on that decision. IRT is irrespective of assessment result (correct vs. incorrect), only indicating attention to prioritizing the experience of the challenge. IRT indicates issue comprehension and response selection. |
| Inquisitive/ Indifferent | Optionals | Courses ideally include optional elements requiring an interaction to reveal hidden content (invisible OR located "off screen"). Optionals can be accessed via hyperlinks which expose content in new windows, buttons that reveal documents or actioned elements (text or graphics) that expose singular OR grouped elements. Optionals are usually content or concepts that are presented in addition to the core content or concepts of the course, to enhance the learning experience or further clarify topic information. Optional selection indicates an interest in expanding comprehension beyond the minimal requirements. |
| | Embedded Optionals | Primary Optionals (POs) may include Embedded Optionals (EOs). The selection of a PO may reveal a group of elements which may include an EO (a hyperlink that, when selected, opens supplemental content in a new browser window (Child window). Selection of an EO indicates an increase in a weighted interest in comprehension. |
| | Web | eLearning courses are experienced |

| Learning Behaviors | Based on scored and weighted actions | Measurement |
|---|---|---|
| | Browser | through the web browser environment. Additional web windows (child windows) may be spawned from the course window (parent, but the learner is not expected to leave the browser environment unless they exit the course. Leaving the browser environment to engage other applications indicates multi-tasking rather than a preference to stay on-task. |
| | Audio | When available - the positive engagement in controlling audio indicates an interest in concept or content clarification (comprehension). Positive audio control engagement is indentified by actions such as: Play, Pause, Replay, Reverse Scrub. |
| | Video | When available - the positive engagement in controlling video indicates an interest in concept or content clarification (comprehension). Positive video control engagement is indentified by actions such as: Play, Pause, Replay, Reverse Scrub. |
| | Paige Turner | If Paige Turner support/control is enabled, any positive engagement with this Training Education Assistive CHaracteR (TEACHR) indicates an interest in content or concept clarification. Positive engagement is identified as a request for help (summon PT to the web screen). |
| Motivated/ Disinterested | Launch | Courses usually have an "available window" during which they can be experienced by a learner (a beginning and an end date). Launching a course within the first quarter of the available window time indicates an interest in engaging the assigned training in a timely manner. |
| | Completion | Courses usually have an "available window" during which they can be experienced by a learner (a beginning and an end date). Completing a course within the first quarter of the available window time indicates an interest in finishing the assigned training in a timely manner. |
| | Text Reading Approach | Reading Speed (words per second) initially measured against 5.5 words per second standard. Subsequently measured against an Individualized Comprehension Standard (ICS). The ICS is based on a personal average |

-continued

| Learning Behaviors | Based on scored and weighted actions | Measurement |
|---|---|---|
| | | aggregate reading rate directly correlating to personal topic/concept comprehension. The ICS establishes both a range for speed and similarity of approach (when experiencing text of near equal construction) and meeting the ICS indicates motivation to read for comprehension. |
| | Optional Engagement | A tendency to engage the majority of optional elements within a course indicates an increased level of interest in exploring possible routes of content or concept clarification or enhancement. Engagement does not equate comprehension. |
| | Assessment | Meeting the minimal requirements for passing an assessment indicates an interest to meet at least the minimal standard established for content or concept comprehension. Intrinsic motivation is indicated when passing an assessment in the first attempt. |
| | Seat Time | Successfully completing a course within the Targeted Comprehension Time (TCT) indicates a desire to finish an assigned task within an expected time frame while presenting the expected behaviors. TCT is established by establishing a minimum length of time required to complete all required tasks within the course. |
| Confidence/ Unsure | Response Time | Interaction Response Time (IRT) represents the optimal time required (as a range-of-time standard) to understand a challenge, make a decision and act on that decision. IRT is irrespective of assessment result (correct vs. incorrect), only indicating attention to prioritizing the experience of the challenge. IRT indicates issue comprehension and response selection. |
| | Approach | Challenges require us to identify a best course of action and then initiate that action within a specific time frame (see IRT above). Approach measures if the learner adheres to their initial course of action or, in reconsideration, modifies their initial response based on no additional information. Modification indicates reconsideration irrespective of challenge outcome (positive or negative) |
| | Success | Measured as meeting or surpassing the minimal requirements of an assessment or challenge on the first attempt. Indicates commitment and confidence. |
| | Optional Engagement | A tendency to engage the majority of optional elements within a course indicates an increased level of interest in exploring possible routes of content or concept clarification or enhancement. Engagement does not equate comprehension. |
| | Hints | Many times a challenge will include a "hint" which, when selected, will reveal information to assist the learner in successfully meeting the challenge. Confident learners will not select these optional hints. |
| Comprehension/ Misunderstanding | Text Reading Approach | Reading Speed (words per second) initially measured against 5.5 words per second standard. Subsequently measured against an Individualized Comprehension Standard (ICS). The ICS is based on a personal average aggregate reading rate directly correlating to personal topic/concept comprehension. The ICS establishes both a range for speed and similarity of approach (when experiencing text of near equal construction) and meeting the ICS indicates intent to read for comprehension. |
| | Response Time | Successful Interaction Response Time (SIRT) represents the optimal time required (as a range-of-time standard) to understand a challenge, make a CORRECT decision and act on that decision. SIRT IS result dependent (correct vs. incorrect). SIRT indicates issue comprehension and CORRECT response selection. |
| | Success | Measured as meeting or surpassing the minimal requirements of an assessment or challenge on the first attempt. Indicates commitment and confidence. |
| | Seat Time | Successfully completing a course within the Targeted Comprehension Time (TCT) indicates a desire to finish an assigned task within an expected time frame while presenting the expected behaviors. |

| Learning Behaviors | Based on scored and weighted actions | Measurement |
|---|---|---|
| | | TCT is established by establishing a minimum length of time required to complete all required tasks within the course. |
| | Discrimination | Courses may include optional elements that require the learner to select them to display the hidden content. Some content may or may not present information the learner requires to assist in comprehension. Optional Content Discrimination (OCD) indicates a learner is able to discern which information is helpful and which is not required. Positive OCD is measured by a high variance in length of time optional content is open based on the time required to determine value. |

LiMS 170 may optionally be implemented as a group of discrete components, modules, or functions. For example, the interactive learning application 110, user interface 120, monitoring function 140, analyzing function 150, and/or reporting function 150 may each be implemented as a different application, with one or more of the applications running on separate computers which are in communication with one another, or may be implemented as separate programs running on the same computer or as functions of the same program running on a computer, for example.

Figure 2:
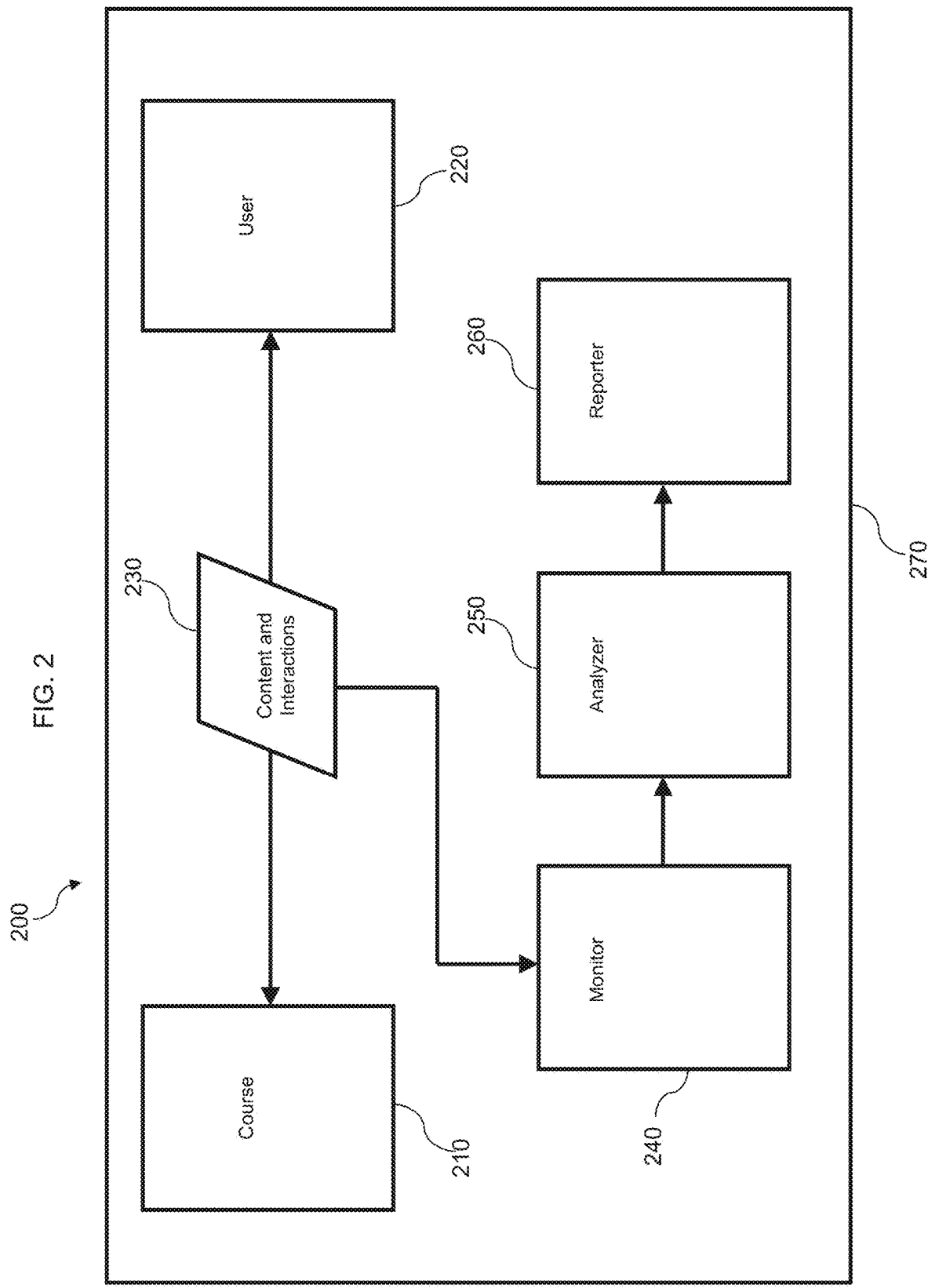
FIG. 2 is a block diagram of another example system illustrating aspects of the invention.

Various permutations of the system topology which do not depart from the spirit of the invention will be clear to those having skill in the art. For example, FIG. 2 shows an example system 200 which functions similarly to system 100, except in that example system 200 is explicitly implemented as one discrete LiMS unit 270. In this example, interactive learning system 210, user interface 220, monitoring function, analyzing function 250, and reporting function 260, as well as all communications among these units, are integrated into one discrete system.

Figure 3:
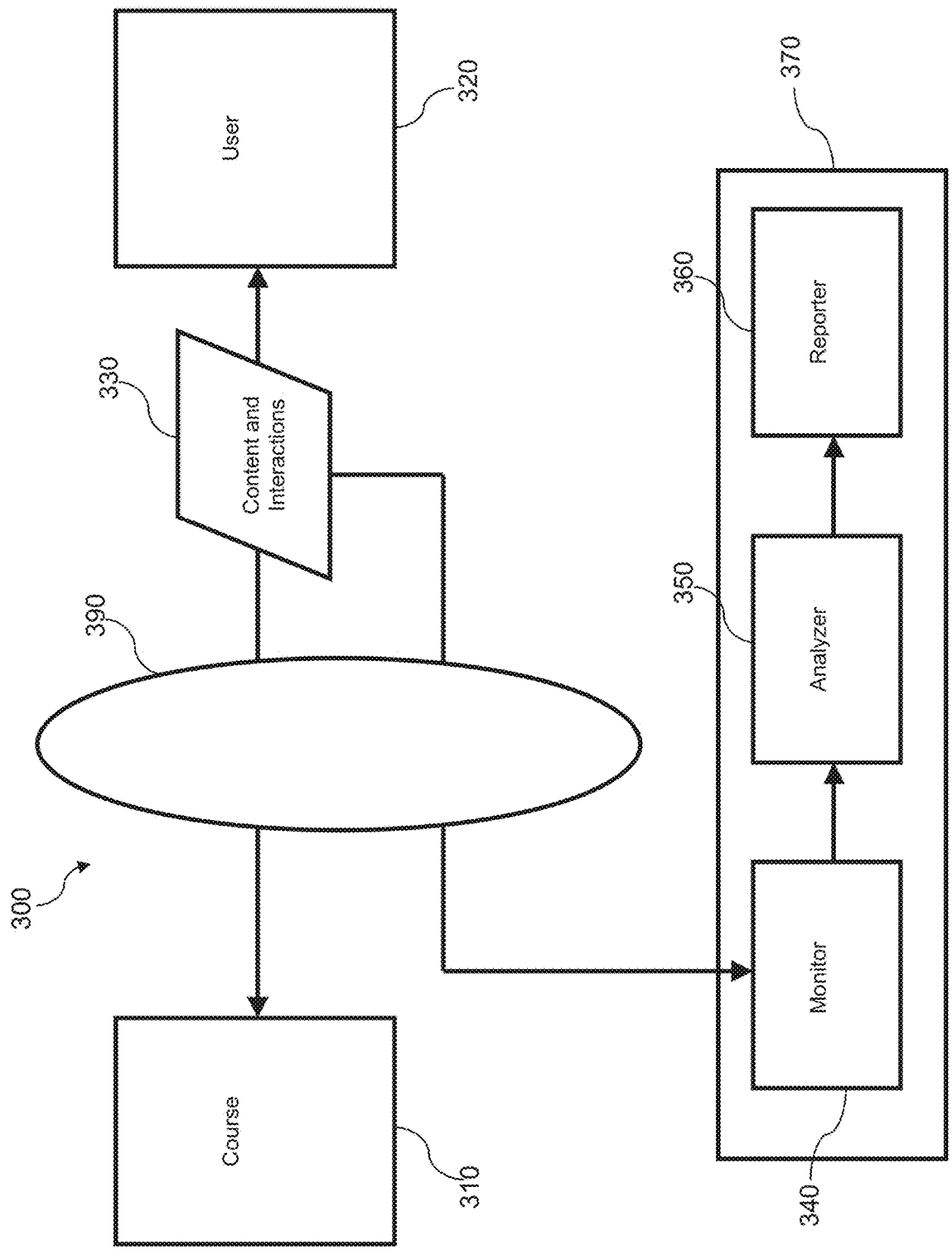
FIG. 3 is a block diagram of a further example system illustrating aspects of the invention.

FIG. 3 is a block diagram of a system 300 which is similar to systems 100 and 200, and illustrates an implementation of aspects of the invention in a typical Internet communications architecture. For example, interactive learning application 310 can be web based, and be served from a web server over a network 390. Network 390 can be the Internet, a local area network, wide area network, mobile communications network, or any other suitable computer communications network. User interface 320 can be a computing device connected to network 390, and may incorporate a web browser or other client interface which can interact with application 310 over network 390. Content and interactions 330 transmitted from application 310 to user interface 320 over network 390 are captured by monitoring function 340 and utilized by analysis function 350 and reporting function 360 in a similar fashion as in systems 100 and 200 (FIGS. 1 and 2). The monitoring function 340, analysis function 350 and reporting function 360 are shown incorporated into a LiMS system 370 which communicates with the interactive learning application 310 and user interface 320 over network 390, but it will be clear to those having skill in the art that various topological implementations are possible as further discussed herein.

Figure 4:
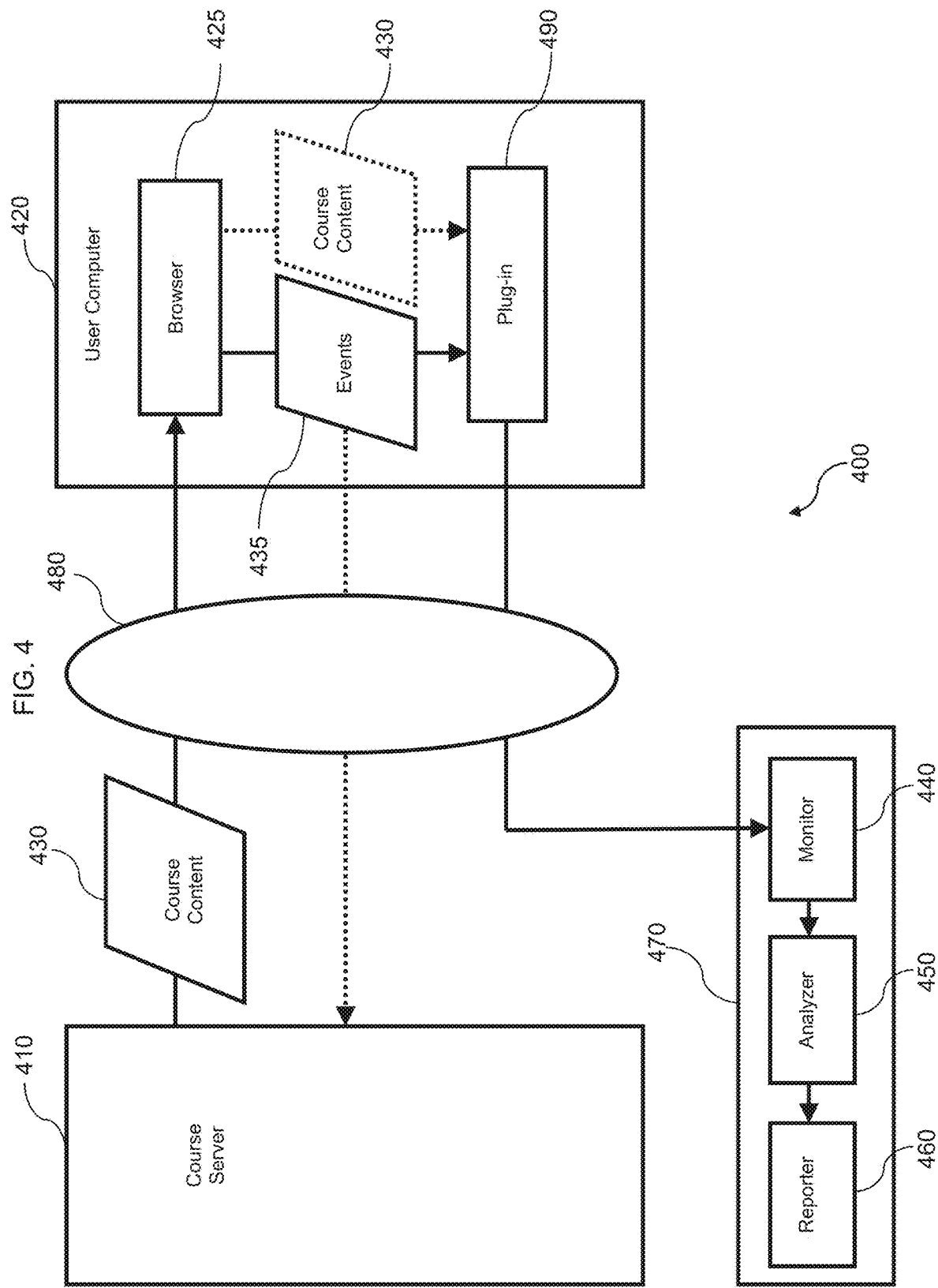
FIG. 4 is a block diagram of still another example system illustrating aspects of the invention.

FIG. 4 illustrates an example system 400 similar to systems 100 200, and 300 (FIGS. 1, 2, and 3) which incorporates a web browser plug-in 490.

Course server 410 is in communication with user computer 420 over network 480, and presents course content 430 to the user of user computer 420 via web browser 425. The user can interact with the course content 430 using web browser 425, generating events 435.

Some or all of events 435 can optionally be transmitted to the course server 410 over network 480. For example, if the user clicks a button in web browser 425 to advance to the next page of a reading, data corresponding to the mouse click is transmitted from the browser 425 to the course server 410 in order to signal completion and may prompt the course server 410 to transmit the next part of the course content 430. In some implementations of system 400, it may not be necessary to transmit events to the course server.

LiMS plug-in 490 captures all events 435 and transmits event information, including event type, a timestamp for the event, and optionally other information relating to the event, to monitoring function 440 over network 480. Optionally, plug-in 490 captures and forwards course content 430 from the browser to monitoring function 440 over network 480.

A plug-in is a software component or set of software components that adds specific abilities to a larger software application, and can enable customization of the functionality of an application. For example, plug-ins are commonly used in web browsers to play video, scan for viruses, and display new file types. Well-known plug-ins examples include Adobe Flash Player, QuickTime, and Microsoft Silverlight. The host application operates independently of the plug-in, making it possible for end-users to add and update plug-ins dynamically without needing to make changes to the host application.

Plug-in 490 captures events relating to the user's interaction with course content 430 that is displayed to the user by the browser 425. In implementations where plug-in 490 forwards events to the course server 410, plug-in 490 may capture a more comprehensive set of events 435 than are transmitted to course server 410 over network 480. For example, if the user hovers a mouse cursor over a selection button that is displayed as a part of course content 430, and the user subsequently clicks the button, plug-in 490 may capture both mouse click event data and mouse hover event data. However because the hover data may not be of interest to the operation of course server 410, only the mouse click data is transmitted to the course server. But if the complete set of event data, including both the mouse click data and the mouse hover data is of interest in analyzing the user's behavioral interaction with the course, the full set of data is captured by plug-in 490 and forwarded to monitoring function 440 over network 480.

The LiMS plug-in 490 can be implemented using JavaScript and/or a JavaScript library such as jQuery, and can be configured to capture all types of user interactions with the course content 430 via browser 425 as events. Typically, plug-in 490 will handle a given event by communicating its occurrence and a timestamp to monitor 470.

For example, when implemented as a web-page the course content 430 can be thought of as containing various objects, such as buttons. Each object can have various properties, such as whether or not it is pressed. If a user clicks the button with a mouse, this button click can be captured as an event, and stored with a timestamp. Further granularity is possible. For instance, separate events can be captured when the mouse button is pressed and when it is released. Other information can also be obtained relating to a button object, such as the amount of time a mouse cursor is hovered over the button even if it is not pressed.

A non-exhaustive list of example events which can be captured by the plug-in 490 and transmitted to the monitor 470 along with a timestamp or other data are listed in the following table:

| Event: | Object: | Triggered When: |
| --- | --- | --- |
| onAbort | Image | The loading of the image is cancelled. |
| onBlur | Button, Checkbox, FileUpload, Layer, Password, Radio, Reset, Select, Submit, Text, TextArea, Window | The object in question loses focus (e.g. by clicking outside it or pressing the TAB key). |
| onChange | FileUpload, Select, Text, TextArea | The data in the form element is changed by the user. |
| onClick | Button, Document, Checkbox, Link, Radio, Reset, Submit | The object is clicked on. |
| onDblClick | Document, Link | The object is double-clicked on. |
| onDragDrop | Window | An icon is dragged and dropped into the browser. |
| onError | Image, Window | A JavaScript error occurs. |
| onFocus | Button, Checkbox, FileUpload, Layer, Password, Radio, Reset, Select, Submit, Text, TextArea, Window | The object in question gains focus (e.g. by clicking on it or pressing the TAB key). |
| onKeyDown | Document, Image, Link, TextArea | The user presses a key. |
| onKeyPress | Document, Image, Link, TextArea | The user presses or holds down a key. |
| onKeyUp | Document, Image, Link, TextArea | The user releases a key. |
| onLoad | Image, Window | The whole page has finished loading. |
| onMouseDown | Button, Document, Link | The user presses a mouse button. |
| onMouseMove | None | The user moves the mouse. |
| onMouseOut | Image, Link | The user moves the mouse away from the object. |
| onMouseOver | Image, Link | The user moves the mouse over the object. |
| onMouseUp | Button, Document, Link | The user releases a mouse button. |
| onMove | Window | The user moves the browser window or frame. |
| onReset | Form | The user clicks the form's Reset button. |
| onResize | Window | The user resizes the browser window or frame. |
| onSelect | Text, Textarea | The user selects text within the field. |
| onSubmit | Form | The user clicks the form's Submit button. |
| onUnload | Window | The user leaves the page. |

This list is not intended to be exhaustive, and those having skill in the art will understand that many other types of objects, events, and event handlers exist and can be used in the same way. For example, all HTML, JavaScript, jQuery, JScript, ActionScript, ECMAScript, VBScript, Java, DOM, events or those of their dialects as well as any other event promulgated under any W3C standard, or any other events usable for any application, web browser, interface, or API can be recorded along with a timestamp or other data.

Monitoring function 440, analyzing function 450, and reporting function 460 each operate in a similar fashion to the corresponding elements in systems 100, 200, and 300, and while they are shown implemented as an analysis and reporting computer 470 that is in communication with plug-in 490 over network 480, various other topologies will be evident to those having skill in the art as further explained herein.

FIG. 5 illustrates another example system 500 which is substantially similar to system 400 (FIG. 4) but illustrates a distributed topology where the course server 510, user computer 520, monitoring function 540, analyzing function 550, and reporting function 560 are each implemented discretely and are in communication over network 580. Such an arrangement can arise when implementing the system modularly among different providers, or in a cloud computing environment, for example. It will be clear to those having skill in the art that various topologies including combinations of the discrete components illustrated in system 500 are possible without departing from the spirit of the invention.

Referring to the various example architectures of FIGS. 1-5, it will be clear to those having skill in the art that different advantages can be obtained by implementing the various permutations of the elements of the systems that are possible, with the different elements of the system variously implemented as discrete or integrated components and occupying various positions in a system or network topology as desired to achieve different purposes.

For example, a standalone system similar to system 200 in FIG. 2 may be desired in order to provide an all-in-one system to a consumer who does not have access to a network or who does not wish to rely upon network connectivity to make use of the system. A networked system similar to systems 300 and 400 in FIGS. 3 and 4 may be preferred in order to provide the course and monitoring system over the internet to a user under a subscriber model. Network systems similar to systems 300, 400, and 500 in FIGS. 3, 4 and 5 may be desired in order to provide LIMS functionality as an add-on service from a separate provider than the provider providing the course material.

In alternative embodiments of the invention, the monitoring, analysis, or reporting functions can each also be implemented in the plug-in using client-side scripting, or in the web server using server-side scripting (not shown).

FIG. 6 illustrates an example reporting dialog 600 according to aspects of the invention. Dialog 600 provides in interface to a reporting function which operates as described with respect to FIGS. 1-5. By interacting with dialog 600, a user can select from a number of different reports to view which are generated based on information from an analysis function which operates as described with respect to FIGS. 1-5.

Figure 7:
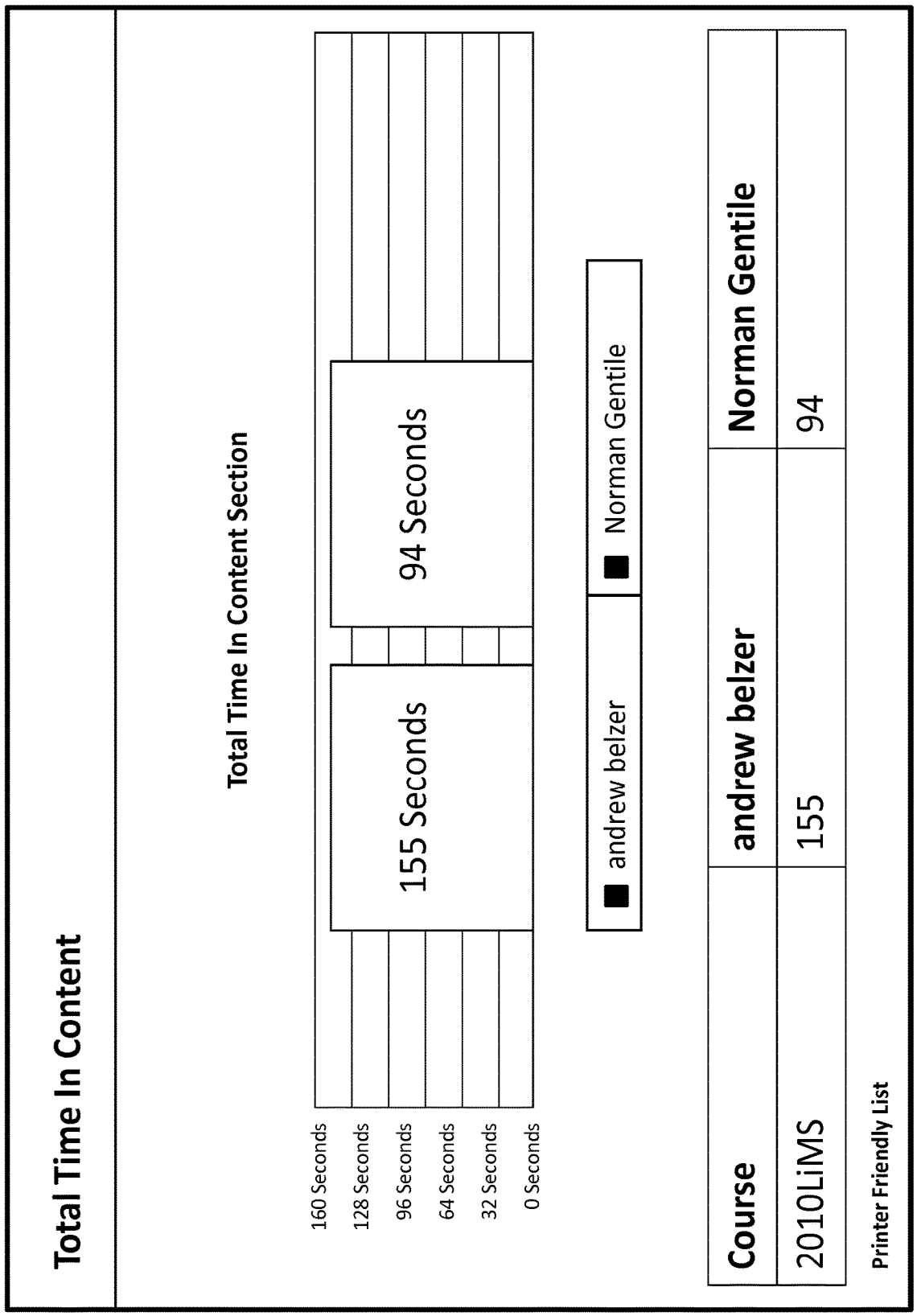
FIG. 7 is an illustration of another example reporting dialog according to aspects of the invention.

FIG. 7 illustrates an example report 700 according to aspects of the invention. Report 700 provides a comparative behavioral analysis of two users with respect to a particular section of content. Report 700 relates that example user Andrew Belzer had a total time in content section of 155 seconds, while example user Norman Gentile had a total time in content section of 94 seconds. This information is displayed both textually and graphically in this example.

The information related by report 700 illustrates that the reporting function can provide raw performance data for a user. For example, the information in report 700 may be generated in any of the systems described with respect to FIGS. 1-5 by recording the time the content was displayed to the user using an event capture, and recording the time the content was completed in a similar fashion. The analysis function may simply calculate the difference between these timestamps to arrive at the total time in content section reported in report 700.

Other types of reports may be generated using this data. For example, if the content section is a passage of text, the text can be captured by the monitoring function, and a baseline reading time can be calculated for the content section. In this way, another report can be generated providing behavioral information for the example users. For example, if the analysis section calculates a baseline reading time of 100 seconds for the content section, a reported behavioral observation could indicate that Andrew Belzer was having difficulty reading the text, or that Norman Gentile was spending an appropriate amount of time reading the text. However, if the calculated baseline reading time were 150 seconds, the behavioral report would reflect that Andrew Belzer was spending an appropriate amount of time reading the passage, while Norman Gentile was not spending enough time reading the passage for adequate comprehension.

However, if in subsequent content sections Norman Gentile correctly answers quiz questions relating to the subject matter while Andrew Belzer does not, the baseline can be adjusted automatically by the analysis section to reflect a more appropriate baseline for that particular content passage and participant audience. Behavioral observations that were made using the original baseline data can then be updated to reflect the new baseline where appropriate. This adaptive calibration can be made more robust by running the course for a larger sample size of course participants. Optionally, the adaptive calibration may only be enabled by the system when a cohort, cross-section, or totality of the course participants reaches a certain number.

In addition to reporting behavioral observations after completion of the course by a user, behavioral observations can also be related to the user in real time. For instance, the system may notify Norman Gentile that he would gain more benefit from the course by spending more time reading when he moves on to a subsequent section of text in the course. Many other configurations of calculation and reporting are possible.

FIG. 8 illustrates another example reporting dialog 800 according to aspects of the invention. Dialog 800 is similar to Dialog 600 (FIG. 6) and provides in interface to reporting functionality. By interacting with dialog 800, a user can select from a number of different reports to view which are generated based on information from an analysis function which operates as described with respect to FIGS. 1-7.

Dialog 800 provides a summary overview of demographic information such as the number of course participants and a breakdown of the participants by age, sex, and the percentage of course participants determined to have attained a desired level of comprehension in a manner consistent with the disclosure herein. Additional information can be provided, such as a listing of the top performing students, an identification of the web browser used by each of the students.

Figure 9:
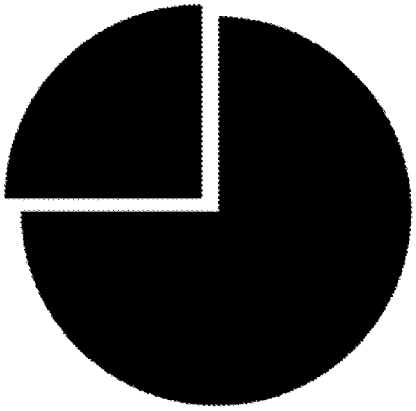
FIG. 9 illustrates another example reporting dialog according to aspects of the invention.

FIG. 9 illustrates another example reporting dialog 900 according to aspects of the invention, which provides information specifically directed to comprehension. Dialog 800 is similar to Dialog 800 (FIG. 8) and provides in interface to reporting functionality. Dialog 900 may be accessed by selecting a link to this information in Dialog 800, or by another suitable means.

Dialog 900 reports measured learning behaviors of an example course participant. Dialog 900 provides a selection of learning behaviors which can be chosen for consideration, including Focus/Distraction, Inquisitive/Indifferent, Motivated/Disinterested, Confidence/Unsure, Comprehension/Misunderstanding, and Enter/Exit frequency. Optionally, dialog 900 can provide other choices. FIG. 9 shows dialog 900 as displaying graphical data pertaining to the Comprehension/Misunderstanding learning behavior. In this example, the course user has been determined to have 14.9% level of comprehension of the course. The determination can have been made in a manner disclosed or substantially consistent with the information disclosed herein.

Figure 10:
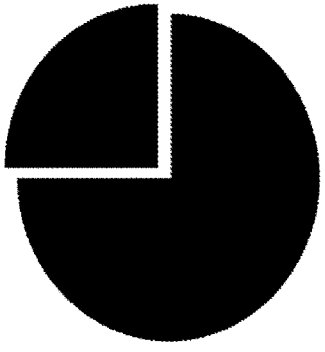
FIG. 10 illustrates another example reporting dialog according to aspects of the invention.

FIG. 10 illustrates another example reporting dialog 1000 according to aspects of the invention, which provides information relevant to the course itself. Here, dialog 1000 reports an evaluation of the presentation of the course content based on an analysis of the data captured during administration of the course to one or more users, and substantially as described herein. Dialog 1000 reports an average calculated reading speed for all of the course materials, and also provides a breakdown of reading speeds for each individual portion of the course text. Because the reading speeds for the majority of sections of text were determined to be too fast in this example, reporting dialog 1000 reports the determination that the course seems to present content in a manner which challenges students to read within a target words-per-second range. Higher word-per-second reading times indicate text skimming by the user, while lower numbers may indicate that the text should be edited for clarity.

Figure 11:
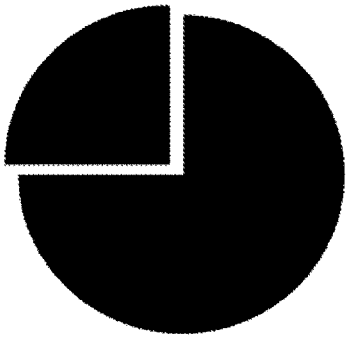
FIG. 11 illustrates another example reporting dialog according to aspects of the invention.

FIG. 11 illustrates another example reporting dialog 1100 according to aspects of the invention which provides information relevant to the course itself. Here, dialog 1100 reports an evaluation of the usage and usability of optional content provided in the course. For example, dialog 1100 reports data on three types of optional content, where an average of 1.5 out of 4 available group content items were opened by users, zero out of 4 available window content items were opened by users, and zero out of 1 available text content items were opened by users. Dialog 1100 graphically reports an overall evaluation score as 87.5% negative and 12.5% positive based upon these observations. Dialog 1100 also reports the determination that learning opportunities such as hyperlinks, pop-ups or other hidden elements that require a learner to perform an action to experience are largely being ignored; that consideration should be given to further encourage the learner to interact with these elements as they tend to clarify or enhance the educational experience; and that in addition, it may be desirable to revisit the benefit of including these optional elements and consider removing them if they are not being used or if they are ineffective, in order to streamline the training.

Presentation of the course content based on an analysis of the data captured during administration of the course to one or more users, and substantially as described herein. Dialog 1000 reports an average calculated reading speed for all of the course materials, and also provides a breakdown of reading speeds for each individual portion of the course text. Because the reading speeds for the majority of sections of text were determined to be too fast in this example, reporting dialog 1000 reports the determination that the course seems to present content in a manner which challenges students to read within a target words-per-second range. Higher word-per-second reading times indicate text skimming by the user, while lower numbers may indicate that the text should be edited for clarity.

Figure 12:
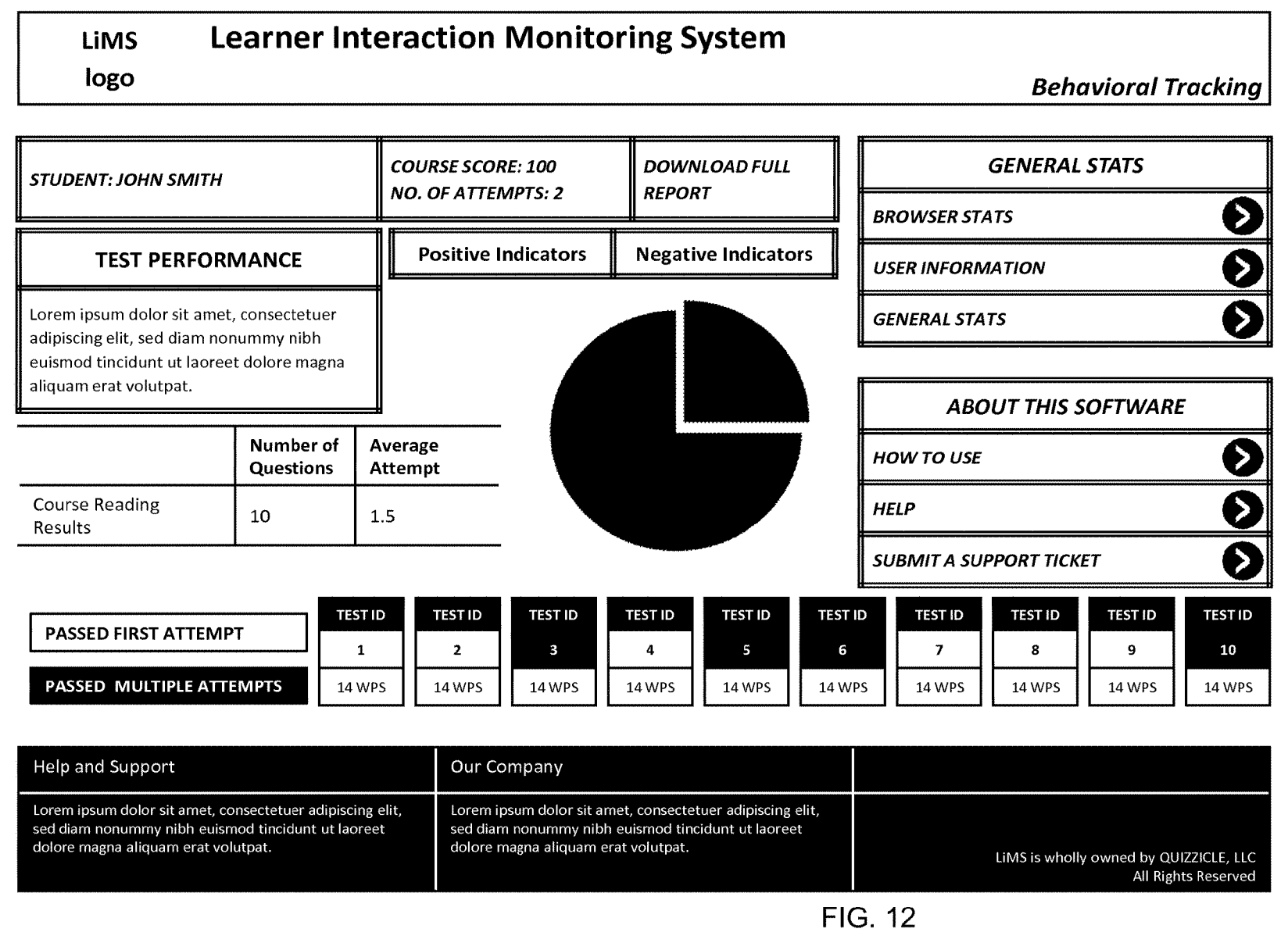

FIG. 12 illustrates another example reporting dialog 1200 according to aspects of the invention which provides information relevant to the course itself. Here, dialog 1200 reports an evaluation of test performance relating to the number of correct answers selected by course participants, and to the number of attempts made by course participants before selecting the correct answer. In this example, dialog 1200 reports an average number of attempts per question, which in this example is 1.25 over 4 questions. Dialog 1200 also reports a calculated overall test completion figure for a first score, here, reported as 75%, and a final score, here, reported as 100%, reported over 2 attempts. A graphical representation of an overall comprehension/non-comprehension score is also presented as 75% non-comprehension, and 25% comprehension. Dialog 1200 also reports a breakdown of the number of attempts required for each question to be answered correctly. Because the test performance was determined to be poor in this example, dialog 1200 reports the determination that a failing score indicates a poor understanding of concepts or content presented within the course; that multiple attempts at answering questions underscores the course participants' challenge with comprehending the course topic.

FIG. 13 illustrates another example reporting dialog 1300 according to aspects of the invention which provides a summary of information relevant to an example course participant. Here, dialog 1300 reports that the course participant had a poor reading speed score of 21.43%, a poor page revisit score of 71.43%, a poor content discrimination score of 11.11%, a poor test performance score of 25%, a good action conviction score of 75%, and a good enter/exit frequency score of 100%. A text based analysis is presented explaining the significance of each of these behavioral determinations.

Here it is reported that based on the reading speed score, the course participant has not read text within the acceptable range. Reading above the range means the user has skimmed the text and their behavior does not indicate comprehension. Reading below the range indicates either a challenge in comprehension, or possible distraction while reading.

Based on the page revisit score, the course participant seems to have difficulty in recalling information. Comprehension requires a true understanding of concepts or processes. The need to revisit previous pages indicates the course participant did not fully grasp content or concepts necessary to complete tasks which build upon previously encountered knowledge.

Based on the content discrimination score, the course participant does not take advantage of learning opportunities that require them to perform an action to experience. Optional learning opportunities afford the student the possibility of enhancing their understanding of concepts or processes. Not electing to engage these may indicate the student understands the topic without the need for additional information or their level of interest may not match what is required for true comprehension.

The test performance score indicates a poor understanding of concepts or content presented within the course. Multiple attempts at answering questions underscores the person's challenge with comprehending the course topic and can assist in reviewing specific challenges based on specific questions. According to some embodiments, a comprehension report similar to the dialog 900 (FIG. 9) can be provided with further details regarding the course participant's comprehension performance.

Based on the conviction of action score, the course participant is determined to show success in making decisions based on a true understanding of a challenge. Based on the enter/exit frequency score, the course participant is determined to show good time management skills, and the ability to minimize distractions and complete tasks within their assigned time frames.

Other relevant text based observations are possible and will be evident to those having skill in the art by reference to this disclosure.

Figure 14:
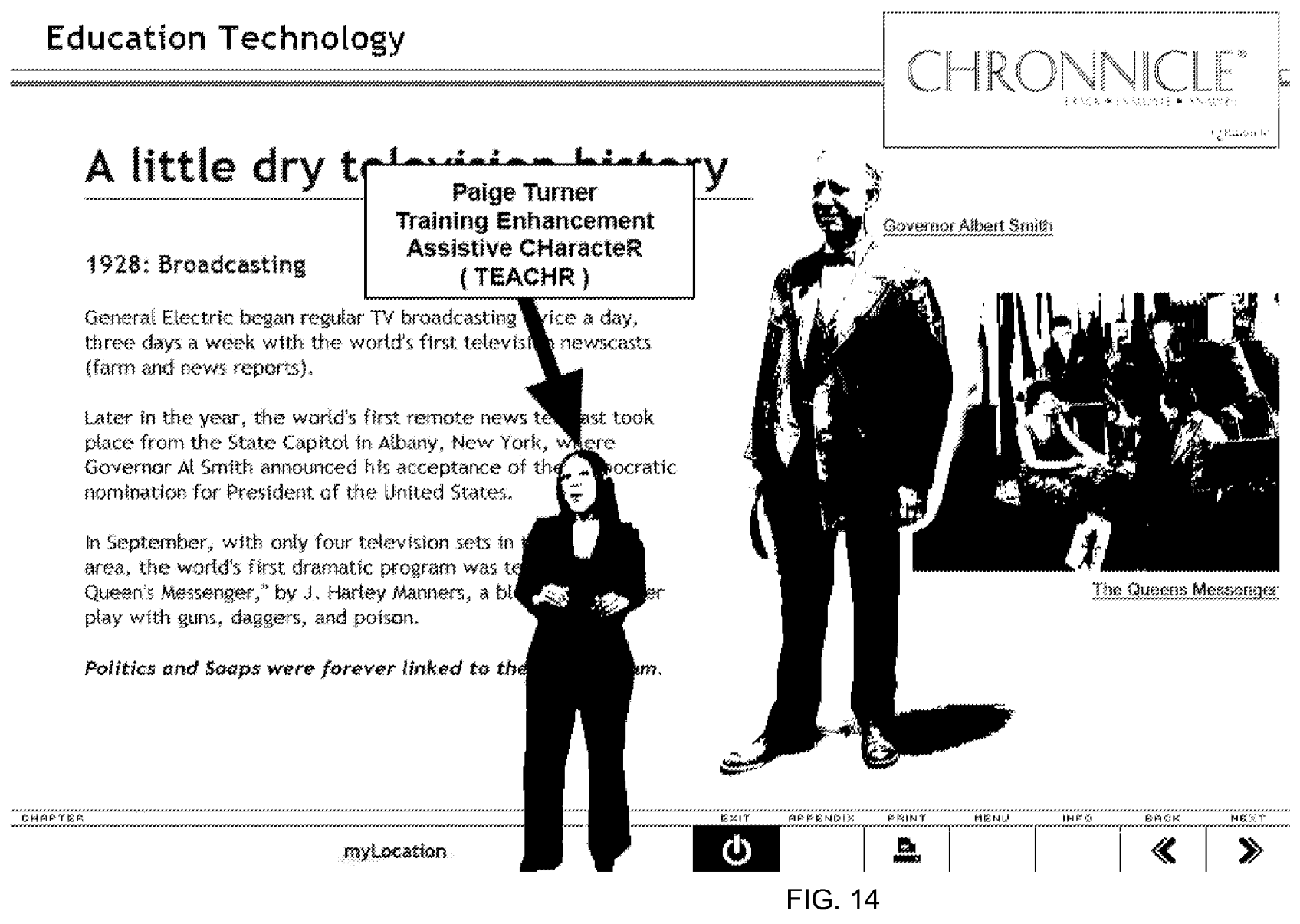

FIG. 14 illustrates an example course participant interaction dialog 1400 illustrating aspects of the invention. Dialog 1400 shows an example page of an online course delivered to a participant, which can be monitored by a LiMS according to any of the systems and methods discussed herein. Dialog 1400 shows a passage of text 1410 which the course participant is expected to read and comprehend, as well as a number of auxiliary materials 1420, 1420', 1420" which the course participant can select for further learning.

In example dialog 1400, if the course participant selects auxiliary materials 1420 or 1420', additional materials are displayed which may include additional text relating to text 1410. Optionally, a TEACH® Training Enhancement Assistive Character™ such as the Paige Turner® construct 1420" may be displayed in order to relate auxiliary information in the style of a live teacher.

Paige Turner® construct 1420" monitors and analyzes learner behaviors in real time, providing a path and process to modify these behaviors—much like a teacher observing a student and correcting his actions. Construct 1420" monitors a student's actions in a more granular manner as it can record not only the result of the student action, but the sequential behaviors which lead up to the action, and has the ability to independently interrupt the student when the timing or sequencing of their behaviors indicates a challenge.

Construct 1420" can also be "summoned" to the screen by the learner to engage in a "dialog" to assist the learner should they encounter a challenge during the course—just like raising a hand in a classroom and asking for help.

Dialog 1400 also includes navigation buttons 1430, 1430', 1430", 1430''', 1430'''' which can control navigation from dialog 1400 to a previous or subsequent part of the online course, or can signal that the course participant is finished, or other similar navigational tasks. Any mouse click or other operation of these controls, e.g. by keyboard, can be captured, time-stamped, and used to analyze user behavior as further described herein. In addition, any other interaction with the browser can be captured, time-stamped, and used to analyze user behavior in this way. For example, the amount of time that a mouse cursor hovers over a particular control, portion of text, or an image in dialog 1400, or the timing between click and release of the mouse button or key may be relevant in making behavioral observations relating to interest or engagement with the topic, decisiveness in answering, comprehension, or any other observation as further discussed herein.

Figure 15:
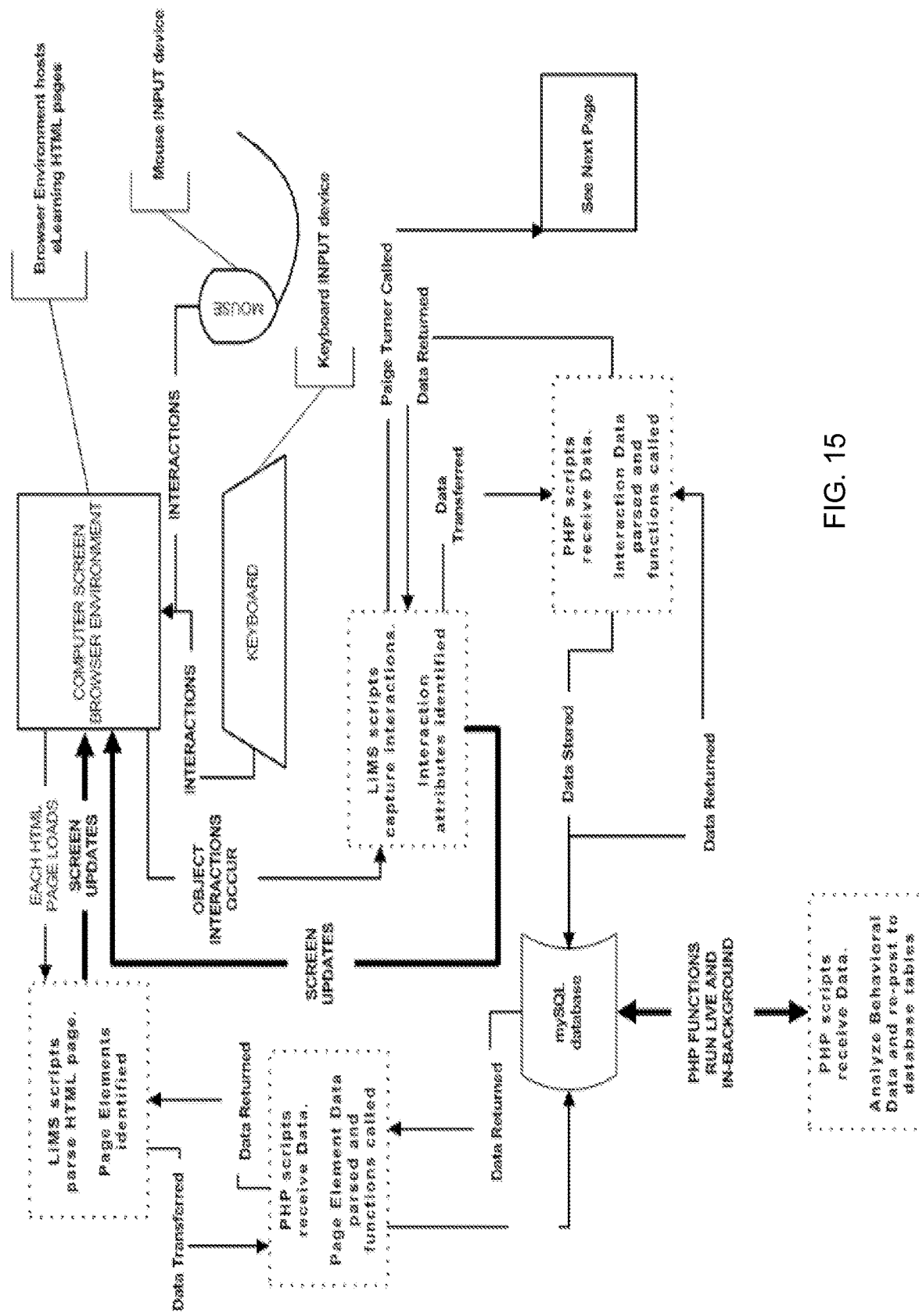
FIGS. 15 and 16 illustrate a further example system according to aspects of the invention
Figure 16:
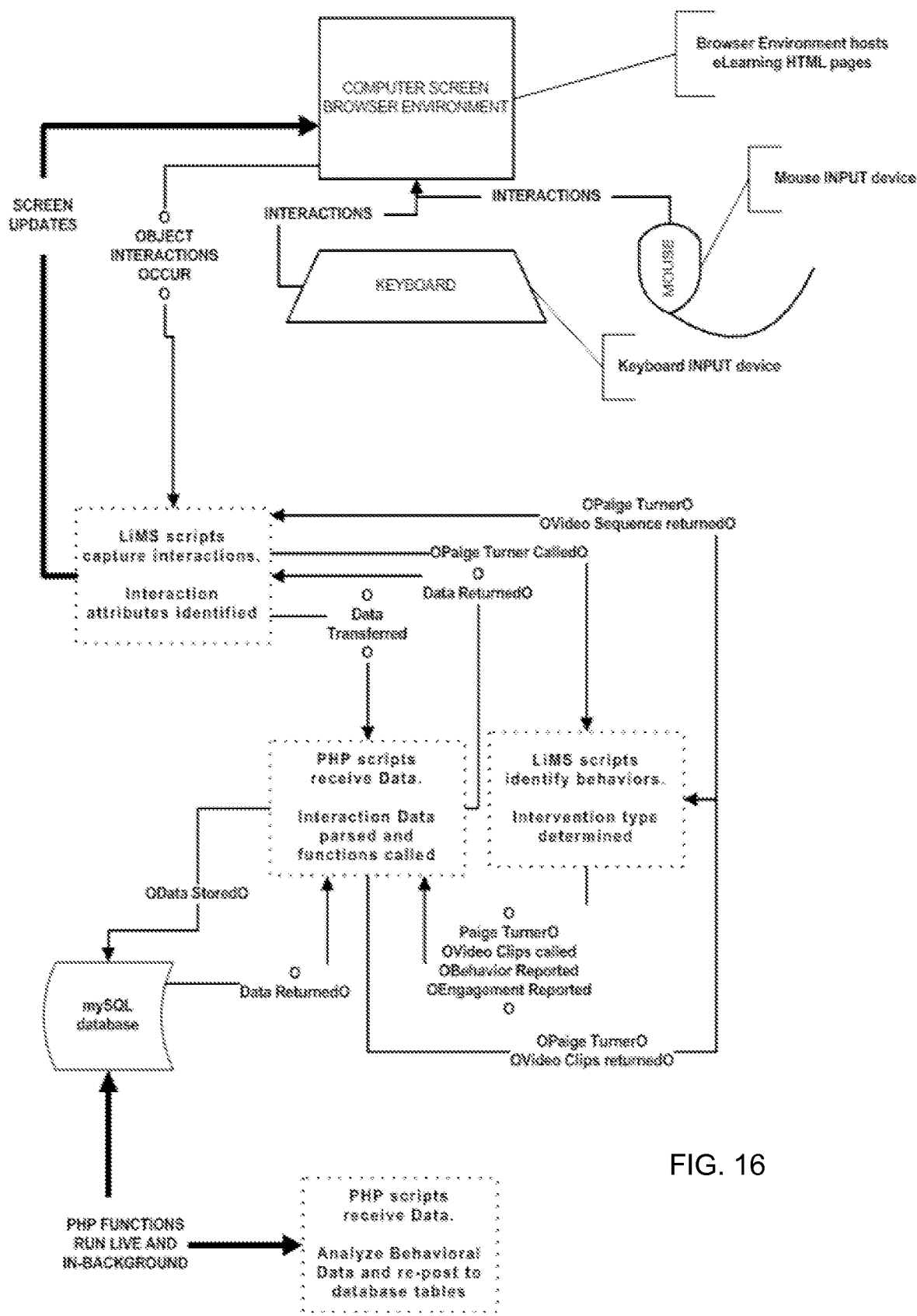

FIGS. 15 and 16 illustrate a further example system 1500 according to aspects of the invention. System 1500 includes a computing device having input elements, including a keyboard and mouse, and output elements, including a display screen and a running browser. The browser receives an eLearning course including HTML pages from an outside source, such as a web server. LiMS scripts parse each HTML page, and identify elements of each page. This data is transmitted to PHP scripts which parse and store the element data in a SQL database, optionally along with a time-stamp. PHP functions running live and in the background receive data from the SQL database and analyze behavioral data, reposting the analyzed behavioral data to database tables in the SQL database. This analyzed behavioral data is returned via PHP scripts to the LiMS scripts and are used to update the screen.

The course participant can interact with the eLearning HTML pages using the input devices. In particular, the course participant interacts with objects in each page, which may include buttons, sliders, and the like, and as further discussed herein. LiMS scripts capture these interactions, and identify interaction attributes. This information can be used to update the screen. This information is also transmitted to PHP scripts which receive the interaction data, parse the interaction data, and store the interaction data in the SQL database. This data is also available to be returned to the LiMS scripts via the PHP scripts.

FIG. 16 illustrates system 1500 with the HTML parsing functionality omitted for clarity of illustration. Optionally, system 1500 may be implemented without this functionality where all of the content of the eLearning course are known to the system apriori. FIG. 16 also illustrates wherein a construct such as Paige Turner® is called by the LiMS scripts for display to the course participant, an intervention type is determined, video clips are called, and the behavior and engagement are reported to the LiMS script, which can parse and store this information in the SQL database.

FIGS. 17-27 illustrate example database entries according to aspects of the invention.

FIG. 17 illustrates an example database table which reflects a number of example page elements appearing on example pages of an eLearning course. Elements appearing in the table of FIG. 17 include buttons, text, hyperlinks, and pop-ups. Many other elements can be used, as discussed herein. Each element is stored in the table along with a timestamp, position, type, and state.

FIG. 18 illustrates an example database table which reflects a number of example event captures of interactions by course participant with example pages of an eLearning course. Events appearing in the table of FIG. 18 are captured in the table with their respective timestamps as well as information relating to the element to which the event pertains, if applicable. Many other events can be used, as discussed herein FIG. 19 illustrates an example database table which reflects statistics for course participants with respect to given pages of the eLearning course. Statistics appearing in each line of the table of FIG. 19 include the student ID, page ID, average time on page, average words read per second, average ratio of groups opened, average ratio of windows opened, average ratio of texts opened, and average question interaction ratio. Many other statistics can be used, as discussed herein FIG. 20 illustrates an example database table showing course participant statistics for questions presented in the eLearning course. Statistics appearing in each line of the table of FIG. 20 include the student ID, question ID, number of attempts, first answer, timestamp for first answer, final answer, final result, whether hints were available for the question, and whether the hint was used for the first attempt. Many other statistics can be used, as discussed herein.

FIG. 21 illustrates an example database table which shows information for pages presented in the eLearning course. Information appearing in each line of the table of FIG. 21 includes the page ID, chapter ID, section ID, page name, total visible words on page, number of groups, number of windows, amount of text, number of questions, number of non-question elements, as well as a timestamp. Many other pieces of information can be used in the table as discussed herein.

FIG. 22 illustrates an example database table which shows event captures by the LiMS during the eLearning course. Information appearing in each line of the table of FIG. 22 includes the action ID, experience ID, element ID, behavior ID, element value, and a timestamp.

FIG. 23 illustrates an example database table which contains information for questions appearing in the eLearning course. Information appearing in each line of the table of FIG. 23 includes the question ID, page ID on which the question appears, question name, question type (multiple choice or true/false), text of the question, correct answer, number of hints available, and a timestamp.

FIG. 24 illustrates an example database table which contains information for chapters appearing in the eLearning course. Information appearing in each line of the table of FIG. 24 includes chapter ID, course ID, chapter type (content or test, for example), total pages in chapter, chapter name, and a timestamp.

Figure 25:
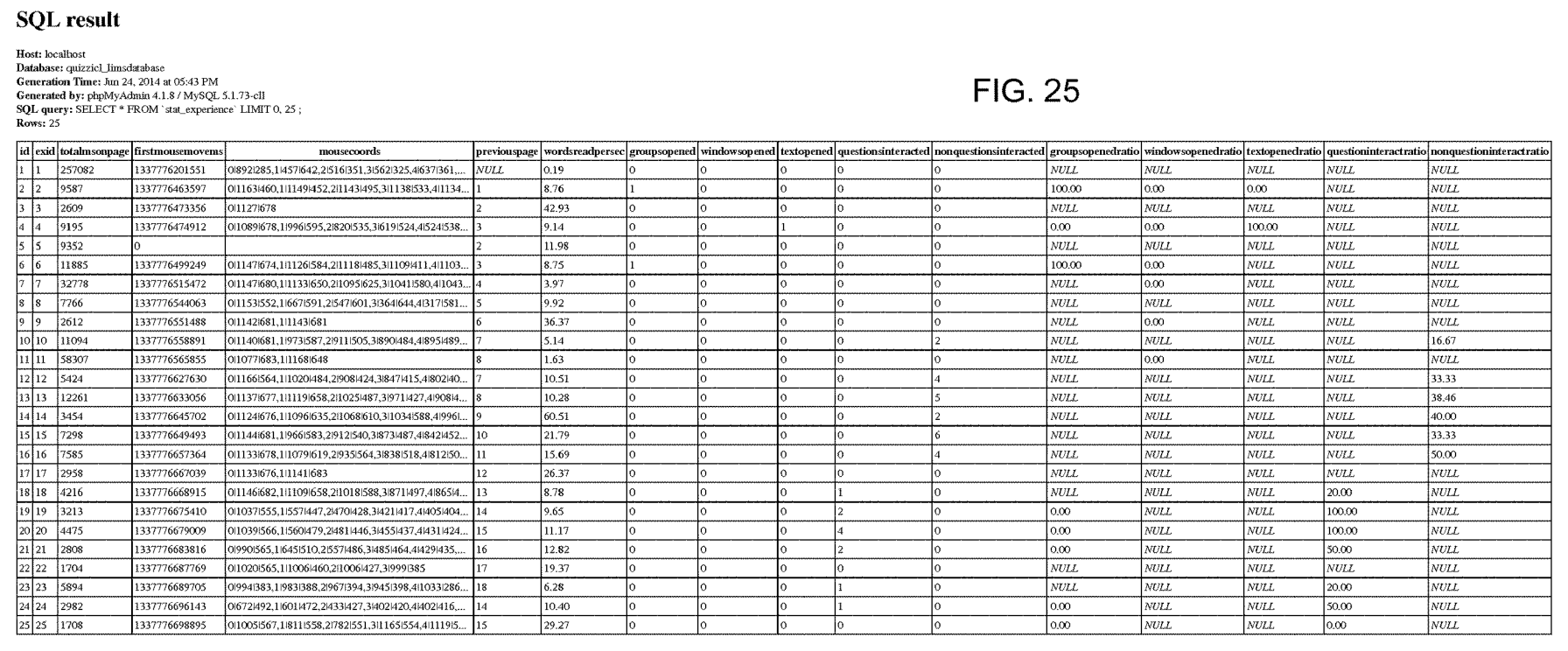

FIG. 25 illustrates an example database table which contains information for various interactions by the course participant with a page of the eLearning course. Information appearing in each line of the table of FIG. 25 includes an experience ID, total time on page, a timestamp for the first movement of a mouse by the user, mouse coordinates, the previous page ID, number of words read per second, number of groups opened, number of windows opened, number of texts opened, number of questions interacted with, number of non-question elements interacted with, ratio of groups opened to groups not opened, ratio of windows opened to not opened, ratio of texts opened to not opened, and number of non-questions opened to not opened.

FIG. 26 illustrates an example database including a number of tables used in implementing an example system according to the invention. Example tables track information relating to actions, answers, users, event captures, chapters, clients, courses, elements, events, experiences, pages, questions, sections, serials, elements, helpfiles, standards, status, student results, course aggregate behavior, statistics, and students, for example. Many other kinds of tables can be used to track relevant information as discussed herein. FIG. 26 also illustrates an example table which contains information related to particular event types. Each line of the table includes an event ID and an event name. Types of events described in the table include the following: abort, beforeunload, blur, change, click, close, dblclick, error, focus, focusin, focusout, keydown, keypress, keyup, load, mousedown, mouseenter, mouseleave, mousemove, mouseout, mouseover, mouseup, pagehide, pageshow, reset, resize, scroll, select, submit, and unload events. Many other kinds of events can be tracked as further discussed herein.

FIGS. 27A and 27B illustrate another example database reflecting various tables stored therein, for operating a system according to the invention.

Although the invention has been described with reference to a particular arrangement of parts, features and the like, these are not intended to exhaust all possible arrangements or features, and indeed many modifications and variations will be ascertainable to those of skill in the art.

What is claimed is:

1. A system for evaluating user behavior relating to a course of study comprising:
   a server computer;
   a network;
   a user computer in communication with the server computer over the network;
   software executing on the server computer transmitting a course of study to said user computer over the network;
   software executing on said user computer receiving a course of study from said server computer which includes a plurality of user tasks;
   software executing on said user computer presenting the course of study to a user of said user computer;
   a pointing device in communication with the user computer;
   a keyboard in communication with the user computer;
   wherein the pointing device and keyboard are used to interact with the course of study to generate at least one of user pointing-device events, scrolling events, and keyboard events;
   software executing on said user computer capturing and storing interaction data indicative of an interaction of the user with the course of study, said interaction data being indicative of more than a selection of an answer or choice made by the user when completing each of the plurality of user tasks, and including identification, duration, and timing of the at least one of user pointing-device events, scrolling events, and keyboard events;
   an analysis module receiving the interaction data and generating a behavioral observation based on the interaction data by identifying sequential behaviors in the interaction data which lead up to the selection of an answer or choice made by the user when completing each of the plurality of user tasks, including comparing a reading time in the interaction data with reading time baseline data, and comparing a response latency in the interaction data with response latency baseline data, the behavioral observation including a determination of the user's interest or confidence in the course of study;
   wherein the behavioral observation is used to modify the course of study in real time, said modifications are selected from the group consisting of: altering material presented to include additional material, altering material presented to remove unused or ineffective elements, and a combination thereof.

2. The system of claim 1, wherein the behavioral observation reflects that the user is having trouble understanding a reading passage if the reading time is greater than a baseline reading time.

3. The system of claim 1, wherein the behavioral observation reflects that a reading passage is problematic if a reading time for more than one user is greater than a baseline reading time.

4. The system of claim 1, wherein the behavioral observation reflects that the user is devoting insufficient time to a task if the reading time is less than a baseline reading time.

5. The system of claim 1, wherein the behavioral observation reflects that the user is experiencing a dilemma if the response latency is greater than a baseline response latency.

6. The system of claim 1, wherein the analysis module determines if a user has accessed a resource.

7. The system of claim 6, wherein the analysis module generates a behavioral observation based upon whether the user has accessed the resource.

8. The system of claim 7, wherein the analysis module generates a behavioral observation based upon whether the user has performed an additional interaction subsequent to accessing the resource.

9. The system of claim 7, wherein the behavioral observation reflects that the user is disinterested in the resource if the user has not accessed the resource.

10. The system of claim 1, wherein the analysis module updates the baseline data based upon the behavioral observation.

11. The system of claim 1, wherein the analysis module updates the baseline data to create updated baseline data based upon a second behavioral observation of a second user.

12. The system of claim 1 further comprising a reporting module receiving the behavioral observation from the analysis module and generating a report using the behavioral observation.

13. The system of claim 12, wherein the report comprises a behavioral grade based on the behavioral observation reflecting an approach to use of training materials by the user when compared to a standard.

14. The system of claim 12, wherein the report comprises a descriptive profile of the user.

15. The system of claim 12, wherein the report comprises a comparison among more than one user.

16. The system of claim 1 wherein the course of study comprises text, a test, a quiz, or an examination.

17. The system of claim 1, wherein the analysis module comprises software executing on an analysis computer that is in communication with the user computer over the network.

18. The system of claim 1, wherein the analysis module comprises software executing on the server computer.

19. The system of claim 1, wherein the analysis module comprises software executing on the user computer.

20. The system of claim 1, wherein a second interaction of the user with the course of study is captured as second interaction data; and the behavioral observation is generated using both the interaction data and the second interaction data.

21. The system of claim 1, wherein a second interaction of the user with the course of study is captured as second interaction data; and a second behavioral observation is generated using both the interaction data and the second interaction data.

22. The system of claim 1, wherein the course of study is presented to a user of the user computer using a web browser.

23. The system of claim 1, wherein the user interactions with the course of study are captured using a web browser plug-in.

24. The system of claim 1, wherein the behavioral observation includes at least one of the following behaviors: focus/distraction, inquisitive/indifferent, motivated/disinterested, confidence/unsure, and comprehension/misunderstanding.

25. The system of claim 1, wherein the generation of the behavioral observation includes identifying the user's need to revisit information displayed earlier in the course of study.

26. The system of claim 1, wherein reading times for a plurality of blocks of text in the course of study are captured.

27. The system of claim 1, wherein the behavioral observation is used to modify the course of study with respect to other users of the course of study in real time while the course of study is in progress.

28. A system for evaluating a course of study comprising:
a first computer;
presentation software executing on the computer and presenting a course of study to a user;
a pointing device in communication with the computer, the pointing device being used to interact with the course of study to generate pointing-device events;
monitoring software executing on the computer and monitoring and storing interactions between the user and the first computer which relate to the course of study and the timeliness and sequence of the interactions, including identification, duration, and timing of the pointing-device events;
analysis software executing on the first computer and analyzing the interactions to generate behavioral observations by identifying sequential behaviors in the interactions which lead up to the selection of an answer or choice made by the user;
and, reporting software executing on the first computer to generate a report of the behavioral observations, the report including a behavioral grade based on the behavioral observation reflecting an approach to use of training materials by the user when compared to a standard;
wherein the behavioral observations are used to modify the course of study in real time, said modifications are selected from the group consisting of: altering material presented to include additional material, altering material presented to remove unused or ineffective elements, and a combination thereof;
the course of study is presented to the user using a web browser; and
the interactions with the course of study are captured using a web browser plug-in.

29. The system of claim 28, wherein the presentation software, the analysis software, or the reporting software executes on a second computer in communication with the first computer.

30. The system of claim 28, wherein an educational helpfulness of an element of the course of study is determined.

31. The system of claim 28, wherein the behavioral observations are used to modify the course of study with respect to other users of the course of study in real time while the course of study is in progress.

32. A method of evaluating a course of study comprising:
providing a user computer;
presenting a course of study, which includes a plurality of user tasks, to a user of the user computer using presentation software executing on the computer;
providing a pointing device, the pointing device being used to interact with the course of study to generate pointing-device events;
monitoring and storing user interactions with the course of study which relate to the course of study, and comprise more than a selection of an answer or choice made by the user when completing each of the plurality of user tasks, including identification, duration, and timing of the pointing-device events, using monitoring software;
analyzing the user interactions with the course of study to generate behavioral observations using analysis software by identifying sequential behaviors in the user interactions which lead up to the selection of an answer or choice made by the user when completing each of the plurality of user tasks, including comparing the user's reading time with a reading time baseline, and comparing the user's response latency in the interactions with a response latency baseline, the behavioral observations including a determination of the user's interest or confidence in the course of study;
wherein the behavioral observations are used to modify the course of study in real time, said modifications are selected from the group consisting of: altering material presented to include additional material, altering material presented to remove unused or ineffective elements, and a combination thereof.

33. The method of claim 32, wherein the user computer is connected to a network and the course is transmitted to the computer from a server computer.

34. The method of claim 32, further comprising presenting the behavioral observations as a report using reporting software.

35. The method of claim 32, further comprising using the behavioral observations to modify the course of study with respect to other users of the course of study.

36. The system of claim 32, wherein the behavioral observations are used to modify the course of study with respect to other users of the course of study in real time while the course of study is in progress.

37. A system for evaluating user behavior relating to a course of study comprising:
a server computer;
a network;
a user computer in communication with the server computer over the network;
software executing on the server computer transmitting a course of study to said user computer over the network;
software executing on said user computer receiving a course of study from said server computer which includes a plurality of user tasks;
software executing on said user computer presenting the course of study to a user of said user computer;
a pointing device in communication with the user computer;
a keyboard in communication with the user computer;
wherein the pointing device and keyboard are used to interact with the course of study to generate at least one of user pointing-device events, scrolling events, and keyboard events;
software executing on said user computer capturing and storing interaction data indicative of an interaction of the user with the course of study, said interaction data being indicative of more than a selection of an answer or choice made by the user when completing each of the plurality of user tasks, and including identification, duration, and timing of the at least one of user pointing-device events, scrolling events, and keyboard events;
an analysis module receiving the interaction data and generating a behavioral observation based on the interaction data by identifying sequential behaviors in the interaction data which lead up to the selection of an answer or choice made by the user when completing each of the plurality of user tasks, including comparing a reading time in the interaction data with reading time baseline data, and comparing a response latency in the interaction data with response latency baseline data, the behavioral observation including a determination of the user's interest or confidence in the course of study;
wherein the behavioral observation is used to modify the course of study in real time, said modifications include editing presented text for clarity.

* * * * *